(12) United States Patent
Bedoe et al.

(10) Patent No.: US 11,201,944 B2
(45) Date of Patent: Dec. 14, 2021

(54) SYSTEM AND METHOD FOR CONNECTING MOBILE DEVICE USERS

(71) Applicants: Ralph Bedoe, Santee, CA (US); Seth Jacobs, Santee, CA (US)

(72) Inventors: Ralph Bedoe, Santee, CA (US); Seth Jacobs, Santee, CA (US); Kaene Soto, Santee, CA (US)

(*) Notice: Subject to any disclaimer, the term of this patent is extended or adjusted under 35 U.S.C. 154(b) by 0 days.

(21) Appl. No.: 16/883,891

(22) Filed: May 26, 2020

(65) Prior Publication Data

US 2020/0374364 A1 Nov. 26, 2020

Related U.S. Application Data

(63) Continuation of application No. PCT/US2020/034440, filed on May 24, 2020.

(60) Provisional application No. 62/852,852, filed on May 24, 2019, provisional application No. 62/928,255, filed on Oct. 30, 2019.

(51) Int. Cl.
| | | |
|---|---|---|
| G06F 15/16 | (2006.01) | |
| H04L 29/08 | (2006.01) | |
| G06Q 50/00 | (2012.01) | |
| H04L 12/58 | (2006.01) | |
| G06K 19/06 | (2006.01) | |

(52) U.S. Cl.
CPC ...... *H04L 67/306* (2013.01); *G06K 19/06037* (2013.01); *G06Q 50/01* (2013.01); *H04L 51/32* (2013.01); *H04L 67/18* (2013.01)

(58) Field of Classification Search
CPC ....... H04L 67/306; H04L 51/32; H04L 67/18; G06K 19/06037; G06Q 50/01

USPC ................................ 709/206, 207, 217, 229
See application file for complete search history.

(56) References Cited

U.S. PATENT DOCUMENTS

| | | |
|---|---|---|
| 9,733,811 B2 | 8/2017 | Rad et al. |
| 10,455,328 B2 | 10/2019 | Moova et al. |
| 2007/0032240 A1* | 2/2007 | Finnegan ........... G06Q 30/0261 455/445 |
| 2008/0042840 A1* | 2/2008 | Christopher .......... H04W 4/029 340/572.1 |
| 2011/0082747 A1 | 4/2011 | Khan et al. |
| 2014/0067958 A1 | 3/2014 | Bradley et al. |

(Continued)

FOREIGN PATENT DOCUMENTS

WO 2013008041 A1 1/2013

*Primary Examiner* — Kaylee J Huang
(74) *Attorney, Agent, or Firm* — Procopio, Cory, Hargreaves & Savitch LLP

(57) ABSTRACT

Systems and methods for connecting users in a social environment are disclosed herein. An example system comprises a database storing user profiles each including identity information related to a respective user; public profiles including information viewable by other users of each user, and unique identifiers for social environments. The system also comprises a server configured to receive a message from a first user device, the message including a unique identifier of the social environment obtained from within the social environment; determine the first user device is located within the social environment based on the unique identifier; identify public profiles associated others users located within the social environment; and match a second user of the one or more users with the first user and transmitting information related to the public profile of the second user to the first user device.

15 Claims, 14 Drawing Sheets

(56) References Cited

U.S. PATENT DOCUMENTS

| | | | |
|---|---|---|---|
| 2014/0114738 A1 | 4/2014 | Tseng et al. | |
| 2014/0258100 A1* | 9/2014 | Pasha | G06Q 10/10 |
| | | | 705/39 |
| 2015/0120406 A1 | 4/2015 | Ekberg | |
| 2016/0171475 A1* | 6/2016 | Hughes | G06Q 30/0259 |
| | | | 455/456.3 |
| 2017/0337722 A1* | 11/2017 | Sullivan | H04L 67/06 |
| 2018/0374164 A1* | 12/2018 | Ozog | G06Q 30/0269 |
| 2020/0311731 A1* | 10/2020 | Maxilom | G06Q 30/016 |

* cited by examiner

SYSTEM AND METHOD FOR CONNECTING MOBILE DEVICE USERS

CROSS-REFERENCE TO RELATED APPLICATIONS

This application is a continuation of PCT/US20/34440, filed on May 24, 2020 and entitled "SYSTEM AND METHOD FOR CONNECTING MOBILE DEVICE USERS," which claims the benefit of U.S. provisional patent application Ser. No. 62/852,852, filed May 24, 2019 and entitled "SYSTEM AND METHOD FOR CONNECTING MOBILE DEVICE USERS," the disclosure of which is hereby incorporated by reference in its entirety. PCT/US20/34440 also claims the benefit of U.S. provisional patent application Ser. No. 62/928,255, filed Oct. 30, 2019 and entitled "SYSTEM AND METHOD FOR CONNECTING MOBILE DEVICE USERS," the disclosure of which is hereby incorporated by reference in its entirety.

BACKGROUND

Technical Field

The present disclosure relates to social media platforms. More specifically, the present disclosure relates to methods and systems for connecting users based on being located at a common social environment.

Related Art

Social media or networking systems have grown increasingly complex in communications environments in order to accommodate a diverse group of end users having various networking needs. Many offer the benefits of automation, convenience, management, and enhanced consumer selections.

Certain connecting methods may be used in order to allow an end user to conduct an on-line search of potential matches or other users to connect therewith. These protocols may relate to job searches, person finding services, real estate searches, or on-line dating. While some believe that on-line dating is simply a matter of matching supply and demand, there is statistical and empirical evidence to suggest that successful on-line dating entails far more.

For example, people having similar and/or compatible character traits and values should be matched together. However, effectively linking two participants together can prove to be a challenging endeavor. Coordinating a relationship between two like-minded individuals can be a significant chore, as there are a number of obstacles and barriers that must be overcome.

SUMMARY

A method for connecting users in a social environment is disclosed herein. The method comprises storing, by a server, a plurality of user profiles in a database, the plurality of user profiles including identity information related to a respective user for each user profile of the plurality of user profiles and storing, by the server, a public profile for each user, each public profile including information viewable by other users. The method also comprises receiving a message from a first user device associated with a first user profile of the plurality of user profiles, the message including a unique identifier of the social environment that is obtained by the first user device while within the social environment; determining the first user is located within the social environment based on the unique identifier; identifying one or more public profiles associated with one or more users of the plurality of users located within the social environment; and matching at least a second user of the one or more users with the first user based at least in part on a public profile of the second user and the first user profile and transmitting information related to the public profile of the second user to the first user device.

In another aspect, a system for connecting users in a social environment is disclosed herein. The system comprises a database and a server comprising one or more processors coupled to the database. The database stores a plurality of user profiles, the plurality of user profiles including identity information related to a respective user for each user profile of the plurality of user profiles; a public profile for each user, each public profile including information viewable by other users; and a plurality of unique identifiers corresponding to a plurality of social environments. The server is configured to execute instructions stored in a memory to receive a message from a first user device associated with a first user profile of the plurality of user profiles, the message including a unique identifier of a social environment that is obtained by the first user device while within the social environment; determine the first user is located within the social environment based on the unique identifier; identify one or more public profiles associated with one or more users of the plurality of users located within the social environment; and match at least a second user of the one or more users with the first user based at least in part on a public profile of the second user and the first user profile and transmitting information related to the public profile of the second user to the first user device.

In another aspect, a device of a first user is disclosed herein. The device comprises at least one memory storing an application for connecting users in a social environment and at least one processor communicatively coupled to the at least one memory. The at least one processor configured to execute the application to obtain a unique identifier of a social environment while within the social environment; transmit a message to a server comprising the unique identifier of the social environment; in response to transmitting the message, receive one or more one public profiles associated with one or more users of the plurality of users located within the social environment; and receive an input from the user selecting a public profile of the received one or more public profiles.

Other advantages and benefits of the disclosed system and methods will be apparent to one of ordinary skill with a review of the following description.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which.

DETAILED DESCRIPTION

Figure 1A:
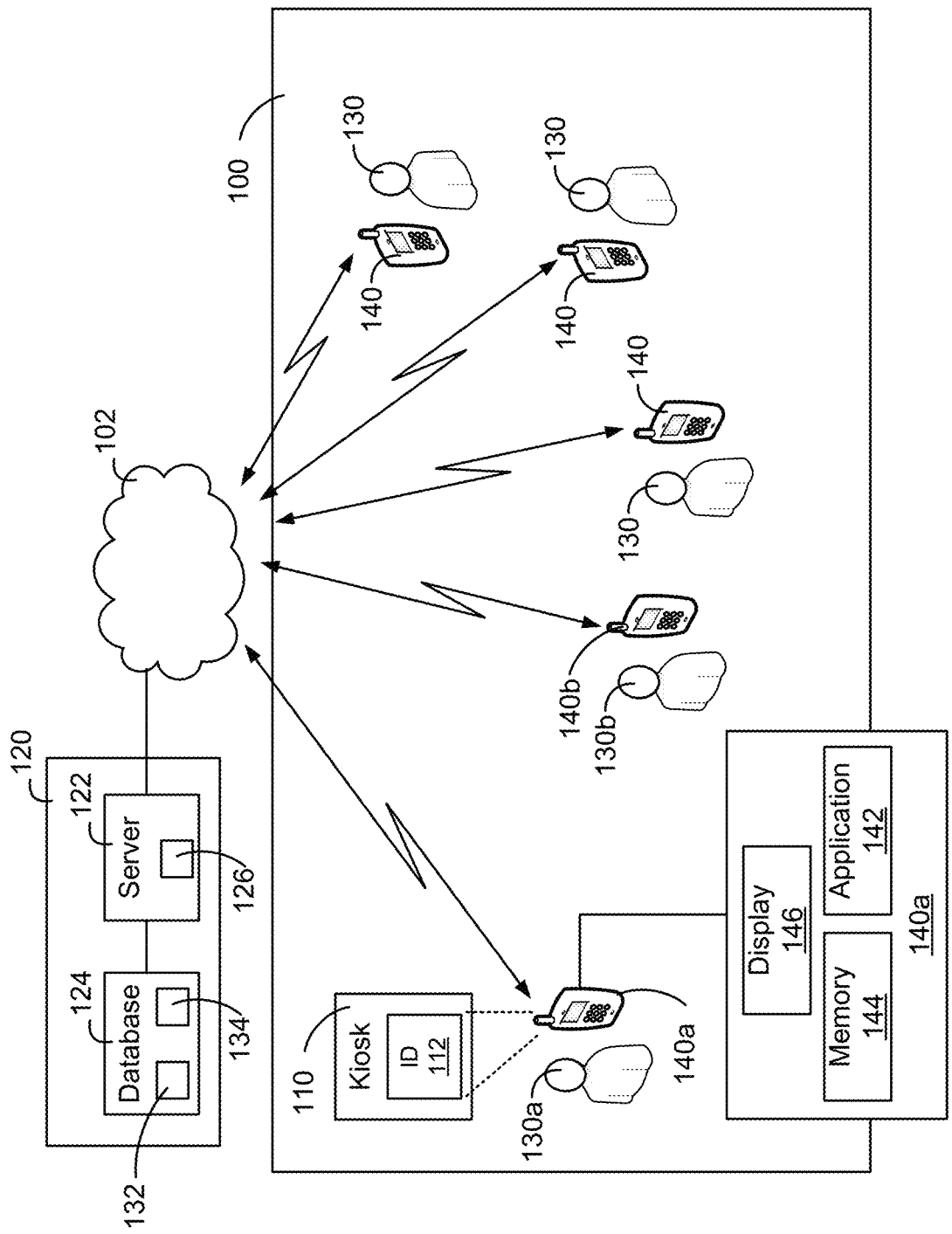
FIGS. 1A and 1B are graphical depictions of a social environment including example environment based matching system in accordance with the present disclosure.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

Embodiments herein can be implemented in numerous ways, including as a process; an apparatus; a system; a computer program product embodied on a computer readable storage medium; and/or a processor, such as a processor configured to execute instructions (e.g., a program or application) stored on and/or provided by a memory communicatively coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Embodiments herein relate to social media platforms. More specifically, embodiments here provide for connecting people for purposes of dating and meeting up based on the location, for example, within a physical social environment. The systems herein can be implemented within one or more entertainment establishments, such as clubs or bars when in dating mode, used before and after clubs on meeting/mingle mode (e.g., referred to herein as social environment). Social environment as used herein may refer to a physical location where one or more person gather to interact with other persons. Example social environments may include, but are not limited to, bars, restaurants, clubs, lounges, entertainment venues (e.g., stadiums, courts, music halls, music venue, etc.), parks, festivals, etc. Social environments herein need not be restricted to physical buildings, but may be a region or area within a defined geographical space by which persons gather for any social purpose.

Many different types of codes or identifiers are being used nowadays to execute processes based on the code or identifier. Some of the most commonly used types of identifiers in use today include barcodes and two-dimensional, matrix codes (e.g., a quick response or QR code). Other identifiers may be in the form of a transmission including an identifier or code (e.g., a universally unique identifier or UUID) broadcasted by devices to mobile devices within range of the transmission.

The disclosed systems and methods can include an application (or app) for operation on a mobile device, mobile electronic device, or mobile wireless device, such as a smartphone, tablet, smart watch (or other wearable mobile device), personal computers, etc. The app can serve as a gateway to a platform to connect people in social environments. That is, the platform may provide a means for persons within the social environment to connect with other persons who are also currently located in the same social environment. The system can allow a user to create a personal profile, meet before going out, and introduce possible matches based on the personal profile and location information obtained while present within the social environment. Location information can be provided by a geofence (e.g., via GPS location, cellular triangulation, Bluetooth low energy (BLE) beacons, Wi-Fi transmitters, near-field communication systems, etc.) or by obtaining a unique identifier. In various embodiments, a unique identifier may be obtained by capturing (e.g., scanning, photographical image, etc.) a specific code (e.g., a QR code, bar code, other machine readable identifier) at a kiosk within the social environment. The user can then have the option to be introduced to potential matches by entering a connection mode within the app, for example, a meet-up or dating mode. The app can allow user-to-user messaging with other users in the same social environment. The app can further allow the user to flag other users they feel are unsafe or that are threatening. These features are advantageous as they allow users to match and meet with one another at a higher rate than other systems based on specific location (e.g., via the QR code). Additionally, these features may allow users to match and meet with one another in a common social setting and identify other users nearby that are interested in connecting.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment.

Furthermore, the particular features, structures, or characteristics may be combined in any suitable manner in one or more embodiments.

Figure 1B:
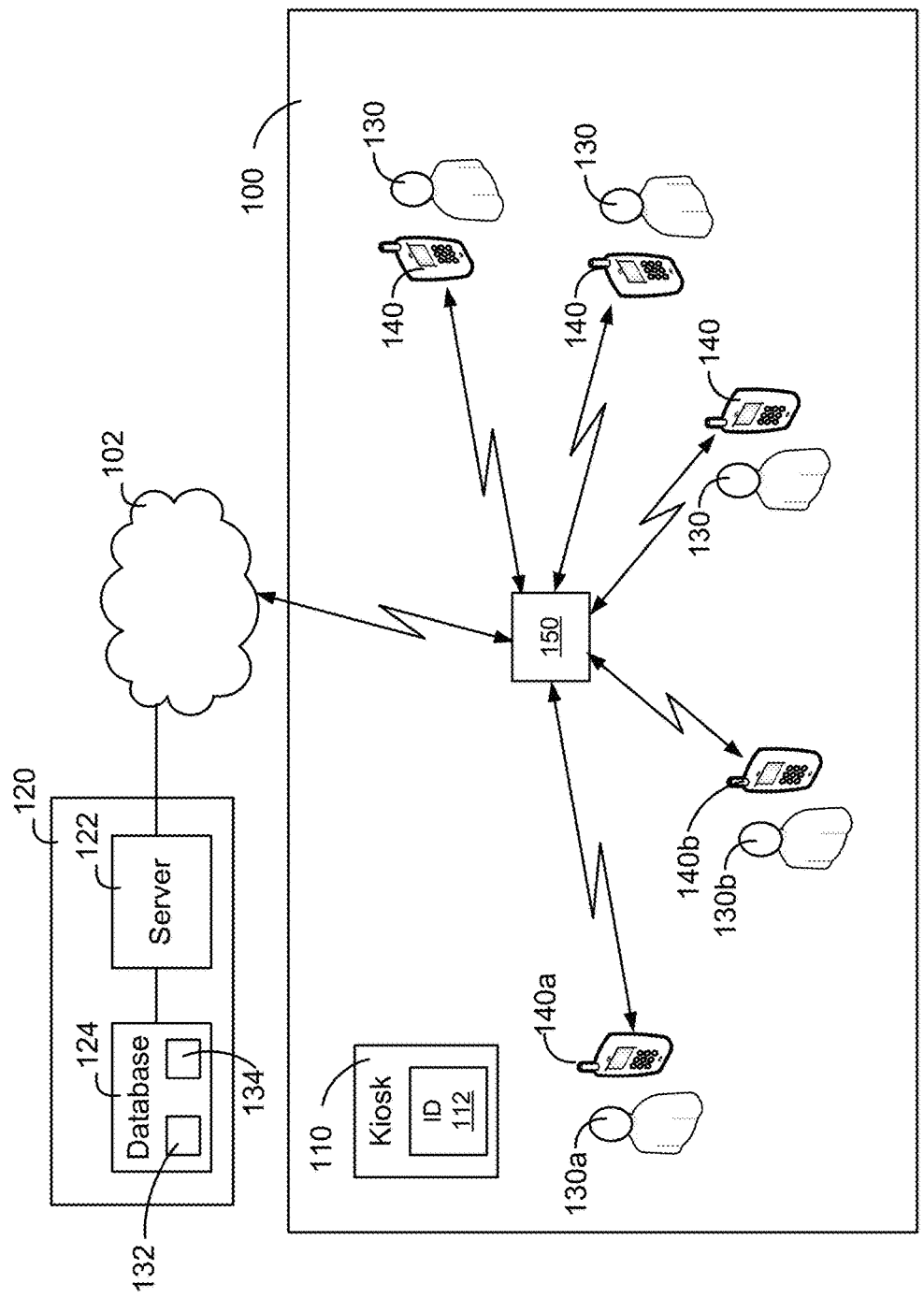

FIGS. 1A and 1B are graphical depictions of a social environment. A social environment 100 can be any location where multiple people meet to interact. For example the social environment 100 can be a nightclub (club), a bar, a restaurant, a social event, a concert, etc.

In some embodiments, for example as shown in FIG. 1A, the social environment 100 can have a kiosk 110. The kiosk 110 can be a structure including an identifier 112 specific to the social environment 100. In some embodiments, the identifier 112 can be a QR code, a bar code, or other identifier that uniquely identifies the social environment 100.

In another embodiment, for example as shown in FIG. 1B, the social environment 100 can have a broadcasting device 150 that emits or otherwise broadcasts identifier 112 within a defined geographic region corresponding to the social environment 100. For example, the broadcasting device 150 may communicate messages comprising the identifier 112. The identifier may also continuously or intermittently at periodic intervals emit a universally unique identifier that is received by mobile device within range of the broadcasting device 150. The broadcasting device 150 may be similar to localization systems used to locate mobile devices within the geographic region, for example, Bluetooth based systems, Wi-Fi base systems, GPS or triangulation based systems, NFC based systems, etc. The broadcasting device 150 may be a BLE beacon that emits a message comprising a specific code or a UUID that is received by devices within range; a Wi-Fi access point that pings devices within range; a radio-frequency identification (RFID) tag that communicates a code or UUID stored therein to nearby mobile devices, etc. In each example, the broadcasting device 150 comprises an antenna configured to emit a radio frequency magnetic field that covers a geographic region corresponding to the social environment 100, and in response to a mobile device entering the field, transmit the identifier 112 to the device.

In some embodiments, the social environment 100 may comprise one or more kiosks 110, one or more broadcasting devices 150, and/or a combination of kiosks 110 and broadcasting devices 150. Accordingly, the present disclosure may refer to kiosk 110, but, unless explicitly stated herein, kiosk 110 will be used to refer kiosk 110, broadcasting device 150, or any combination thereof. Furthermore, in various embodiments, the unique identifier 112 may be disposed throughout the social environment 100, for example, located on posters, coasters, promotions, etc. that are distributed about the social environment. In this way, the user 130 may utilize a camera coupled to the user device 140 (e.g., via camera application accessed by application 142) to scan any of the distributed unique identifiers 112, thereby signing into the social environment. Furthermore, other users 130 may have already scanned the unique identifier 112, stored on the user device 140 of the other user, and then scanned using the user device 140.

The kiosk 110 can be a standalone device associated with a social matching system (system) 120. The system 120 can include a server 122. The server 122 can have one or more processors for performing functions associated with matching users of the system 120, such as those described in connection with FIGS. 2 and 6A-6B. The server 122 can be coupled to a database 124. The database 124 can store information about the location of the social environment 100. The database 124 may store a plurality of unique identifiers (e.g., identifier 112) associated with a plurality of social environments 100. For example, each unique identifier 112 may be stored in a profile 132 of the social environment and associated with a name and/or geographic location of the social environment 100. The unique identifier 112 may be automatically generated based on the social environment registering with server 122. The unique identifier 404 may be static and unchanged. The data base 124 may also store information related to a plurality of users 130 within the social environment.

In some cases the users 130 are labeled with a letter, such as users 130a, 130b. The plurality of users 130 can each have a user device 140 (e.g., mobiles devices such as smartphone, tablet, laptop computer, smartwatch, wearable smart technology, etc.). In some cases the user devices 140 are labeled with a letter, such as user devices 140a, 140b. The user devices 140 can be mobile devices capable of computing processes and wireless communications, for example, by transmitting and received signals comprising data in the form of data packets or messages (referred to interchangeably herein as messages) from other devices. The user devices 140 can be smartphones. Each user device 140 may comprise an application 142 executing on the user system 140 for interacting with a side application 126 to perform one or more of the processes described herein. The user device 140 may further comprise, be communicatively coupled with, or otherwise have access to one or more local memory 144 (e.g., memory or non-transitory computer readable medium storage device as described herein). For example, user device 140 may comprise one or more processes which manage the memory 144. A user device 140 may submit data (e.g., user data, contact data, image data, etc.) to be stored in memory 144, and/or request access to data stored in memory 144. The application 142 may be comprised of instructions stored in the memory 144.

Server 122 may comprise web servers which host one or more applications, websites and/or web services. The server 122 can be capable of computing processes and wireless communications, for example, by transmitting and received signals comprising data in the form of data packets or messages (referred to interchangeably herein as messages) from other devices. Server 122, via application 126, transmits or serves these user interfaces in response to requests or messages (e.g., signals containing data) from the user devices 140 that can be displayed on display 146. In some embodiments, these user interfaces may be served in the form of a user application interface, in which case two or more graphical user interfaces (GUI) may be served in a sequential manner, and one or more of the sequential user interfaces may depend on an interaction of the user or user device 140 with one or more preceding user interfaces. Example GUI are provided below in FIGS. 3A-4 and 6. The requests to system 120 and the responses from system 120, including the interactions with user interfaces, may both be communicated through network 102. These user interfaces or web services may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database 124) that are locally and/or remotely accessible to system 120.

A user device 140 or server application 126 executing on system 120 may submit data to be stored in database 124, and/or request access to data stored in database 124. Any suitable database may be utilized, including without limitation MySQL™, Oracle™, IBM™, Microsoft SQL™, Sybase™, Access™, and the like, including cloud-based database instances and proprietary databases. Data may be sent to system 120, for instance, using the well-known POST request supported by HTTP, via FTP, etc. This data, as well as other requests, may be handled, for example, by server-side web technology, such as a servlet or other software module (e.g., application 126), executed by system 120.

In embodiments in which a web service is provided, system 120 may receive requests from the user device 140, and provide responses in eXtensible Markup Language (XML) and/or any other suitable or desired format. In such embodiments, system 120 may provide an application programming interface (API) which defines the manner in which the user device 140 may interact with the web service. Thus, user device 140 can define their own user interfaces, and rely on the web service to implement or otherwise provide the backend processes, methods, functionality, storage, etc., described herein. For example, in such an embodiment, a client application 142 executing on the user device 140 may interact with a server application 126 executing on system 120 to execute one or more or a portion of one or more of the various functions, processes, methods, and/or software modules described herein. Client application 142 may be "thin," in which case processing is primarily carried out server-side by server application 126. A basic example of a thin client application is a browser application, which simply requests, receives, and renders webpages at the user device 140, while the server application 126 is responsible for generating the webpages and managing database functions. Alternatively, the client application may be "thick," in which case processing is primarily carried out client-side by the client application 142. It should be understood that client application 142 may perform an amount of processing, relative to server application 126, at any point along this spectrum between "thin" and "thick," depending on the design goals of the particular implementation. In any case, the application described herein, which may wholly reside on either system 120 (e.g., in which case application 126 performs all processing) or user device 140 (e.g., in which case application 140 performs all processing) or be distributed between system 120 and user device 140 (e.g., in which case server application 126 and client application 142 both perform processing), can comprise one or more executable software modules that implement one or more of the processes, methods, or functions of the application(s) described herein.

As described below in connection with FIG. 2, the system 120 (or the server 122 executing application 126, more specifically) can perform various social networking or matching functions to connect or link the users 130 via their respective user devices 140 that operate an app associated with the system 120.

The users 130 can each create a user profile 132 and a public profile 134 (e.g., stored in the database 124 and/or locally on respective memory 144) that indicate information about the users. In some examples, the user profile 132 can include information about specific user preferences about a match and the public profile can include information users want other users to view.

In some implementations, a first user 130a can use a first user device 140a to create a user profile 132 and a public profile 134. Similarly, a second user 130b can use a second user device 140b to create a user profile 132 and a public profile 134. In some embodiments, the user 130 may create use profile and/or public profiles via a web-portal either on a desktop computer or respective user devices 140. As the users 130 enter the social environment 100, they can user their respective user devices 140 to obtain the identifier 112, for example, by scanning the identifier 112 on the kiosk 110 or receiving it from broadcasting device 150. The user device 140 can then generate a message comprising the unique identifier and wirelessly transmit the message to the server 120 via a network 102. The server 120 can then "add" the respective users to a group associated with the social environment 100. The server 120 can then provide public profiles 134 to the user devices 140 for all of the other users 130 in the social environment 100. The users 130 can then be "matched" based on various search and filter criteria, in addition to manual interaction with the user devices 140 (e.g., swipes, presses, or selections via an associated user interface or touchscreen), as described herein.

Network 102 may be a wide area network (WAN) that provides access to, for example, the Internet, and platform 110 may communicate with user devices 130 through the Internet using standard transmission protocols, such as HyperText Transfer Protocol (HTTP), Secure HTTP (HTTPS), File Transfer Protocol (FTP), FTP Secure (FTPS), SSH FTP (SFTP), and the like, as well as proprietary protocols. In various embodiments, the network may communicatively coupled to the system 120 and/or user devices 140 through standard communication network protocols, such as, but not limited to, Bluetooth, LTE 4G, 5G, GSM, CDMA, cellular network protocols and the like.

Figure 2:
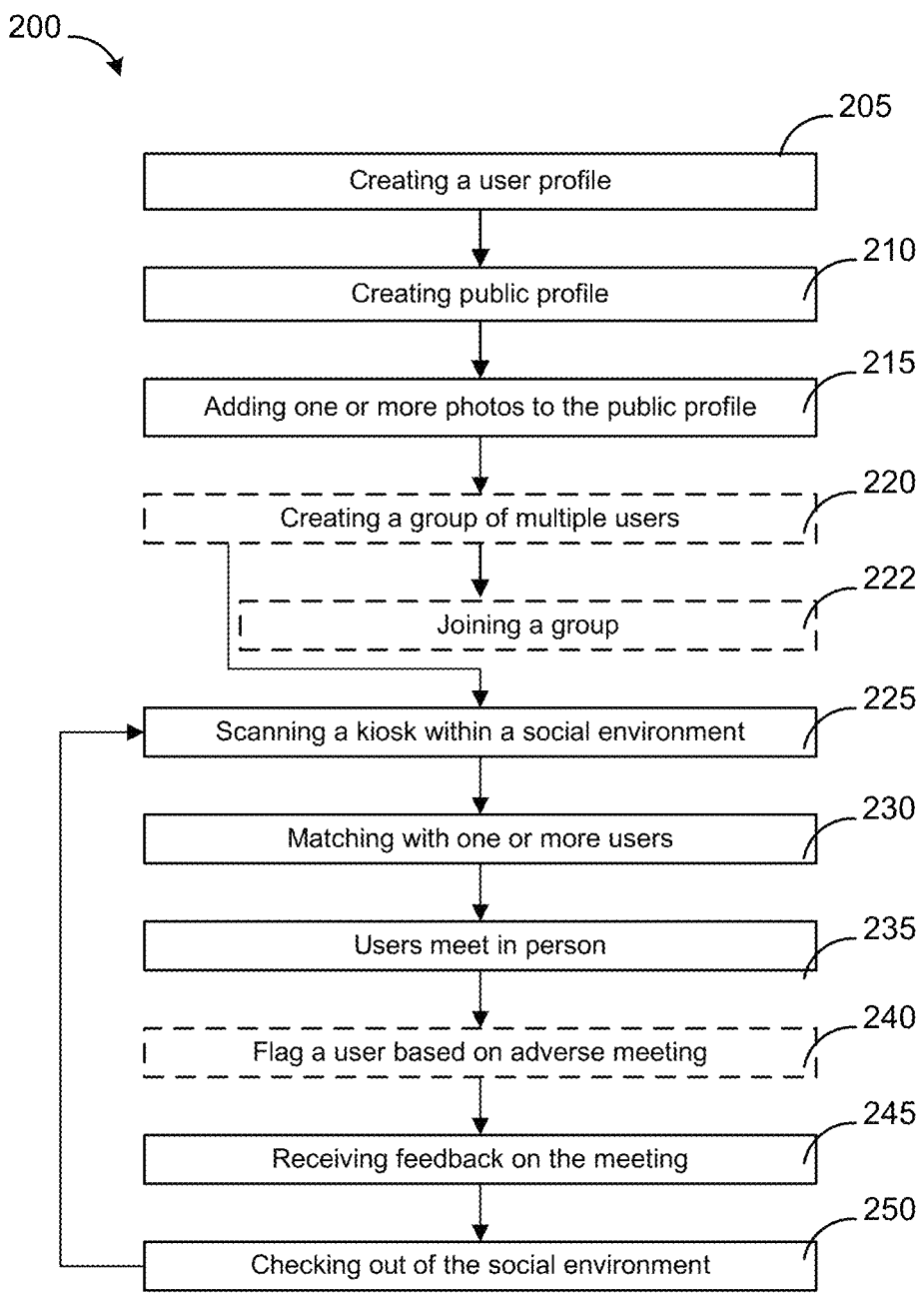
FIG. 2 is a flowchart of a method for connecting users in the social environment of FIG. 1 in accordance with the present disclosure.
Figure 3A:
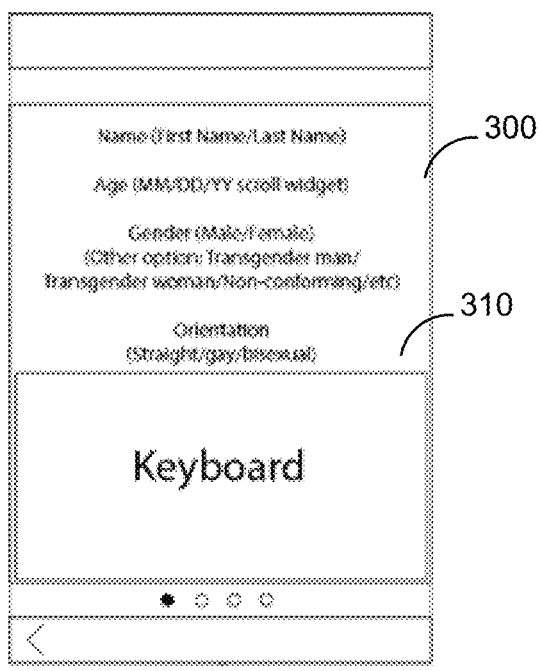
FIGS. 3A-3D are graphical depictions of embodiments of various screens of a graphical user interface for creating a user profile for the environment based matching system in accordance with the present disclosure.
Figure 3B:
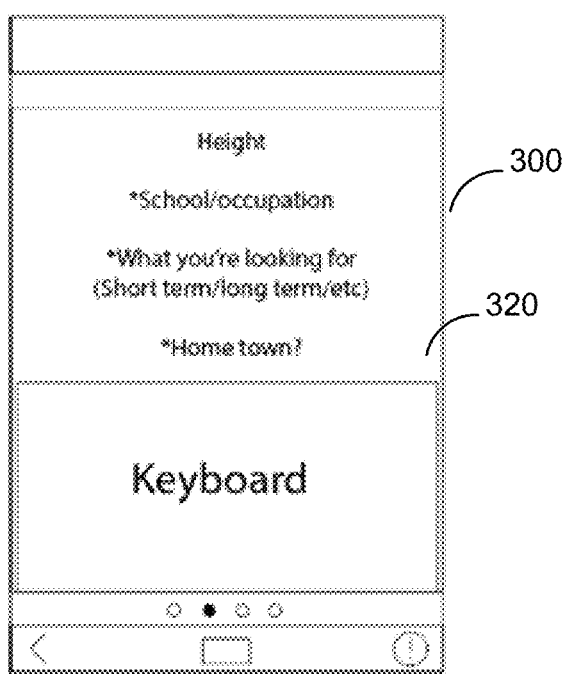
Figure 3C:
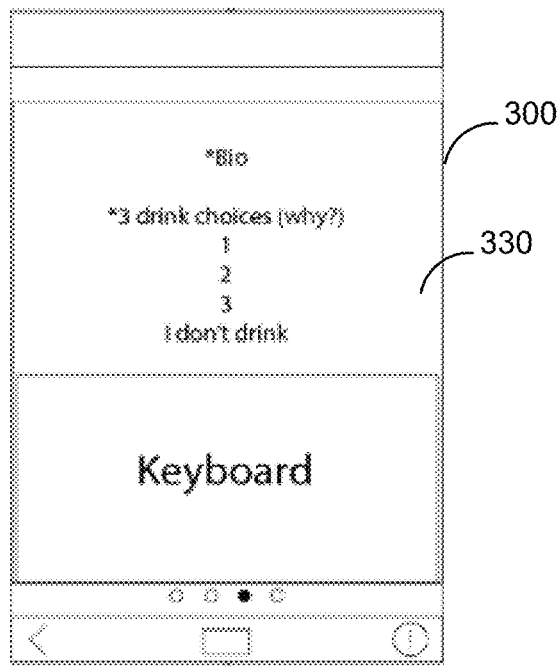
Figure 3D:
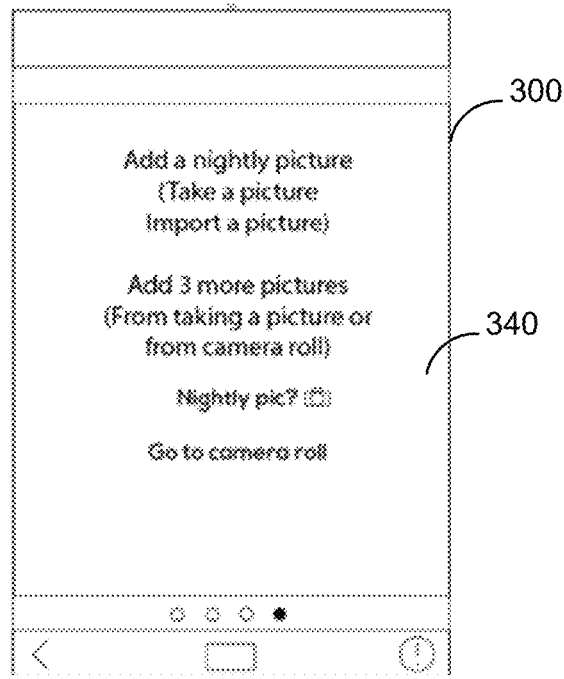

FIG. 2 is a flowchart of a method for connecting users in a social environment using the system 120 of FIG. 1. A method 100 can begin with a user creating a user profile at block 205. The user profile can be created via a web-portal either on a desktop computer or mobile electronic device (e.g., smartphone, tablet, laptop computer, etc.). The user profile can be saved to a memory, such as database 124. The memory can be a local memory within the mobile device, a remote memory in a remote server (e.g., the Internet), or in a distributed memory (e.g., cloud computing).

The user profile can include a username and a credential (e.g., password, biometric credential, etc.). In some embodiments, the credential can have various requirements (e.g., at least (1) capital letter, at least (1) lowercase, at least (1) symbol, at least (1) number, at least 6 characters long). In some embodiments the credential may be biometric information that authenticates the user, such as a fingerprint, facial recognition, iris pattern, etc.).

In some embodiments, the user profile can include certain personal information, such as a birthday, an email address, a phone number, etc. The personal information can be stored in the user profile and accessible via the app.

At block 210, the user can sign into the app and create a public profile. The public profile can include various pieces of information that the user wants to appear to other users. For example, the public profile can include height, gender, eye color, hair color, education, occupation, hometown, sexual orientation, and certain specific details about a desired match. For example, details about a desired match can include whether the user is looking for friendship, a date, a long-term relationship, etc. These details can further include various elements or other specific details desirable in a match. In some embodiments, this can include things the user looks for in a friendship, Zodiac sign, gender the user is interested in, interesting facts about the user, where the user was born, things the user likes to do in spare time, looking for relationship, casual, or unsure, among other details and desires.

At block 215, the user profile can save one or more public photos. The user can also link their public profile to one or more social media platforms, such as Facebook®, Instagram®, etc. In various embodiments, the one or more public photos may include a current photo (sometimes referred to herein as a nightly photo), photos uploaded from the mobile device (e.g., stored on the device), and/or downloaded from one or more other social media platforms.

At block 220, the user can indicate a desire to meet up with a group of other users of the app. In some examples, this can be an optional step for the method 200. A (single) user can activate a Group Mode within the app. Group Mode can allow the user to connect with other users before going to a social environment 100. This can allow creating of a group, in which one user of the group can become a group leader within the app. Other users can be added via username or phone number. The group leader can indicate a maximum number people/users for the group, which locations (e.g., clubs) the group is interested in visiting, and general time to meet at the club(s). The group leader can filter the group to who sees the invitation to the group or even the existence of the group within the app. For example, the group leader can limit the people in the group based on the filter to, for example, female only, male only, anyone, a certain age range, location, etc. Group chat can also be enabled in the group and may be accessible to group users/members In addition to creating the group, at block 222, a user can search for a group or a single user. For example, a user interested in meeting or group interested in meeting others can interact with the app (e.g., via one or more "swipes" on the display of the mobile device) on one or more profile in their desired demographic range. The demographic range refers to a user's preferences regarding an age range, gender, etc. of whom they would like to meet up with at the social environment 100. Upon matching with another user, (e.g., accomplished through a user swiping "match" with another user who also swipes "match", pertaining to one another), either party can send an invitation to join the group or request an invitation to join the group, with the other user (or group leader) accepting or denying the request. As users are added to groups, the visibility of other potential parties can change due to number of vacant spots remaining in the host group. As used herein, visibility is refers to what "groups" users will be able to swipe on due to the change in availability as people match and groups are filled. Upon all vacant spots within the group being filled, non-viable links will then vanish between that group and other users. A user gains access to group messages upon being added to a group.

At block 225, the user can obtain the unique identifier using the mobile device. For example, the user can scan the kiosk using the mobile device. Scanning the kiosk can include placing the unique identifier from the kiosk within a view finder of the mobile device. The mobile device can then transmit an image of the unique identifier to the server. As another example, the mobile device may receive the unique identifier from a broadcasting device, and then transmit the unique identifier to the server. The server can then add the mobile device (in addition to the user profile for the subject user) to the location group. The mobile device can view public profiles of other users in the same location, based on the scanning. In some embodiments, the unique identifier may be separate from the kiosk, for example, one or more unique identifiers may be distributed about the social environment (e.g., on coasters, posters, mobile devices of other users, etc.). In another embodiment, the user may be a unique identifier associated with the user, which is displayable via the app. The user may then place the personal unique identifier within a view finder of the kiosk for scanning. The kiosk can then transmit an image of the unique identifier to the server, which then adds the mobile device to the location group.

At block 230, the user can be matched with one or more other users within the social environment. In some implementations, a directional swipe or other interaction with the mobile device (e.g., via a user interface or touch display) can indicate the user is interested in meeting a second user. For example, a user can swipe up to like someone and swipe down to not like or dislike someone (or left and right). In some other examples, a user can double tap to "super like" the second users. The first user may then appear on the screen of the second user highlighted in a first color (e.g., blue). The user can depress the screen (e.g., hold a finger down) to "ultra like" the second users. The first user may then appear on the display of the second user device highlighted in a second color (e.g., highlighted white). If both the first user and the second user indicate a desire to meet the other, then the first user and the second user are "matched." Once the first user matches with one or more second users, each will receive notifications showing respective matches. The app can further provide options to start a conversation with one or more matches. Users will also have the option to send quick messages indicating a desire to meet at a specific location within the social environment ("Meet at bar", "Meet on dancefloor", "Meet out back", etc.).

In some examples, the app can further provide one or more "conversation starter options" or icebreaker options to the users.

At block 235, the matched individuals can meet and interact in person, based on the messaging.

At block 240, the user can (optionally) flag the second user if based on an uncomfortable interaction. For example, if one user does or says something to offend or discomfort another user, the "flag" function is available to set an alert. The alert can appear in the offending user's public profile. In some embodiments, staff within the social environment 100 (e.g., management, bouncers, security, etc.) can receive the alert. This will allow the staff to take remedial action as needed. In some examples, if a user receives a predetermined number of strikes over a specified amount of time, their account can be locked and/or blacklisted, making it unusable following a review.

At block 245, the user can input (and the system can receive) feedback based on the interaction between the first user and the second user. For example, one or both users can confirm or deny that the meet up with most recent match was a success. In addition, other details can be included, such as how well the meeting went (e.g., good, ok, poor). Such details can be implemented simply such as through the display of a post-match check box. Such a check box can be green indicating a complete or successful meeting while a red box can indicate an unsuccessful or bad meeting. A successful meet-up can allow each user to interact with one another for a time (e.g., 48 hours, a week, etc.), allowing them to exchange other forms of communication or unmatch before a clearance/wiping of their match history occurs prior to the next weekend.

At block 250, the user can check out of the social environment. This can include checking out of the location within the app. Checking out of the social environment 100 may require scanning the unique identifier on the way out of the social environment. Checking out may alternatively include manually interacting with the mobile device to select a "check out" option. In some other embodiments, the app may log the user out after a certain time period due to inactivity. Alternatively, checking out may be automatic based on geo-fencing within the app.

Thereafter, the user can use the app at a second social environment 100 (e.g., another club).

FIGS. 3A-3D are graphical depictions of embodiments of various screens of a GUI 300 generated by the system 120 for creating a user profile 132 and/or public profile 134, as seen by a user via an app on a first mobile device. The GUI 300 may be executed by either the application 126 and/or application 142 (thinly or thick), as described above, and displayed on a display 146 of the user device 140. The GUI 300 may generate one or more visualization screens to be generated and displayed on the user device 140 for interaction by the user. In various embodiments, the one or more screens may include icon(s) or virtual button(s) generated by the application that the user may interact with (e.g., press, swipe, voice command, etc.), which may cause the application execute functions of the system.

GUI 300 shown in FIGS. 3A-3D graphically displays multiple screens 310-340 through which a user can input information for creating a user profile 132 and/or a public profile 134. Each screen 310-340 may include one or more input fields for inputting user information, which may be input by dropdown menus, scroll widgets, etc. and/or entry via a keyboard. For example, at screen 310 the user may interact with GUI 300 to input his/her name, age, gender, and sexual orientation. At screen 320, the user may input his/her height, education, occupation, and hometown, as well as enter details about a desired match, including but not limited to, whether the user is looking for friendship, a date, a long-term relationship, At screen 330, the user may create a public profile 134 (e.g., a bio) that is viewable by other users of the system 120. The public profile 134 may include all of the information entered in the user profile 132, parts of the user profile 132, and/or different or additional information, as desired by the user. At screen 330, the user may enter services preferences (e.g., drink and/or food preferences). At screen 340, the user can upload multiple pictures to his/her user profile 132. The pictures may be viewable to other users as part of the public profile 134. Once the user completes each screen, the user can swipe to the next screen and/or select a "Next" button (not shown) to transition to the subsequent screen.

In various embodiments, the multiple pictures may include a nightly picture and one or more additional pictures. The nightly picture is an image of the user for the current instance of using the application 142 (e.g., such that the other users of the system 120 are able to identify the user using the nightly picture). The nightly picture may be referred to as a current picture, new picture, etc. and may be representative of the user's current physical appearance. The nightly picture may be captured using by the application 142 using a camera coupled to the user device 140 and/or uploaded from storage on the user device 140. In some embodiments, the system 120 may verify that an uploaded picture is a nightly photo, for example, by confirming that an uploaded picture was captured recently based on a timestamp in metadata. The timestamp may be compared against a threshold time period (e.g., within the last hour, day, etc. as desired). If the image was captured outside of the threshold, then the system 120 may reject the image as a nightly image. In some embodiments, the system 120 prompts the user to provide a nightly image at predetermined times, for example, once a day, once an evening, and/or when accessing the application. For example, if a user accesses the application 142 after 5:00 PM on a given day, the system 120 may prompt the user to upload a new nightly picture prior to permitting access to other functions of the system.

The information provided at screens 310-340 is uploaded to the server 122 and stored in the database 124 as the user profile 134 and/or public profile 132. The information provided at screens 310-340 may be stored locally at the user device 140.

While creating the user profile 132 is illustrated herein as four screens, it will be appreciated that the user profile 132 may be created in any number of screens, For example, screens 310-340 may be implemented as a single screen generated by the GUI 300 that the user scrolls through to complete. The user profile 132 may include the example information and/or additional information as desired for application of the system. For example, the user profile 132 may also include religious preferences, activities of interest to the user and/or desired matches, dislikes, physical preferences, etc.

In some embodiments, the screens 310-340 are generated in a first instance of accessing the application 142 by a user. For example, after downloading the application, the user may register with the server 122 by creating a username and authentication credentials via GUI 300. Once the user has registered, the GUI 300 may generate one or more of screens 310-340 for creating the user profile 132 and public profile 134. In another example, the user may edit the user profile 132 and public profile 134 from within the application 142.

Figure 4:
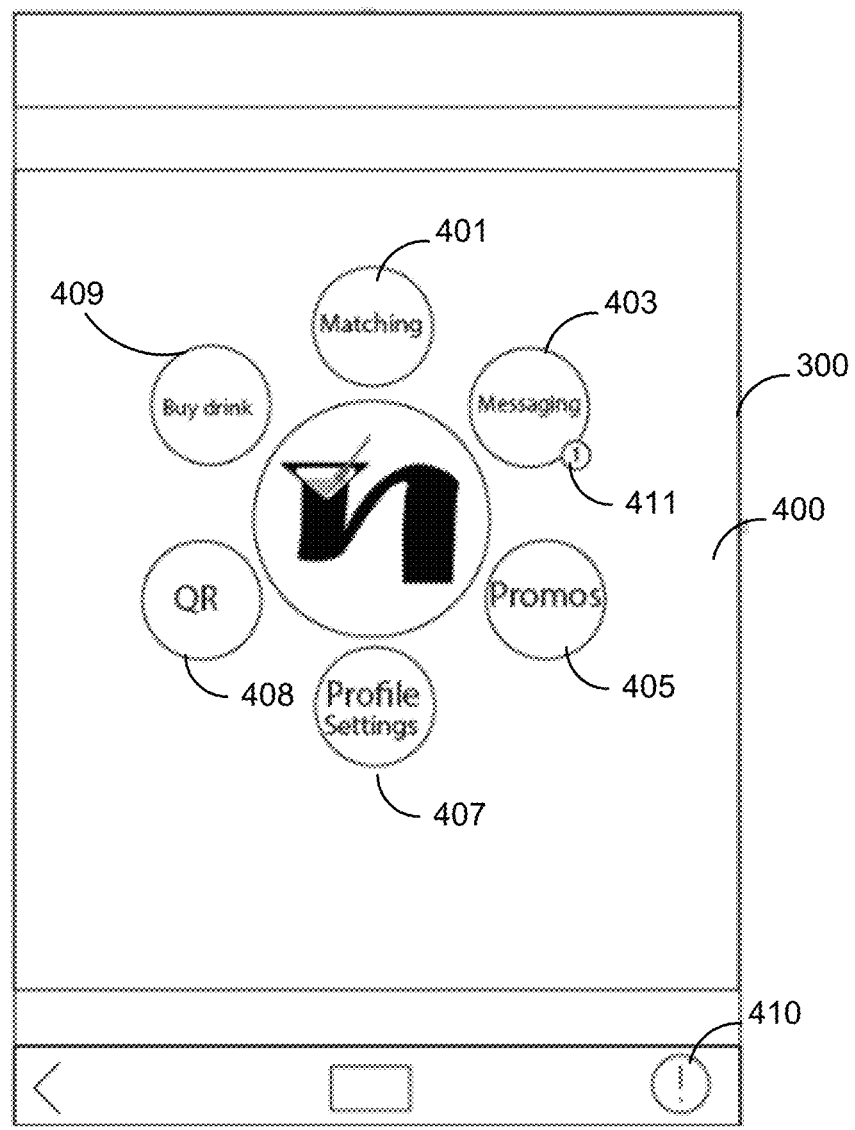
FIG. 4 is a graphical depictions of an embodiment of a home screen of a graphical user interface for the environment based matching system in accordance with the present disclosure.

FIG. 4 is a graphical depiction of an embodiment of a home screen of GUI 300 generated by the system 120 for connecting with other users, as seen by a user via the app on a second mobile device.

Screen 400 illustrates an example home screen generated when a user accesses the application 142 once the user is registered and signs into the application. The home screen comprises a plurality of icons 401-409 (or virtual buttons) through which the user may interact to perform the various functions of the application. For example, interacting with matching icon 401 causes the system 120 to perform environment based user matching functions as described herein for connecting users within a social environment. Interacting with messaging icon 403 causes the system 120 to generate a messaging or chat feature for communicating between connected users. Messaging may be implemented as a text message (e.g., SMS, MMS, etc.) and/or internet base messaging services. Screen 400 also shows indicator 411 including a number displayed therein of the number of new or unread messages received by the application 142 from other users. Promos icon 405 provides access to promotion functionality of the system 120. Profile setting icon 407 provides access screens for creating and editing the user profile 132 and/or public profile 134. For example, interacting with icon 407 may cause GUI 300 to generate screens 310-340 as described above. QR icon 408 provides access to unique identifiers, for example, where a user has signed into a social environment the QR icon 408 provides access to the unique identifier of the social environment. The QR icon 408 also provides access to the user's personal unique identifier. Request services icon 409 provides access service requesting functionality, whereby a user may order food, drinks, or other consumer goods from the social environment 100 via the application 142 and pay via the personal unique identifier. In various embodiments, payment methods (e.g., credit cards, bank accounts, Venmo®, etc.) may be provided in the user profile 132 and associated with a personal unique identifier for effectuating payment. Home screen 400 also includes icon 410 for accessing the flag or alert functionality as described in connection to FIG. 2 and/or FIG. 9. In various embodiments, icon 410 may be included in numerous screens of the GUI (e.g., as shown in FIGS. 5A-5C and 7A-9).

Figure 5A:
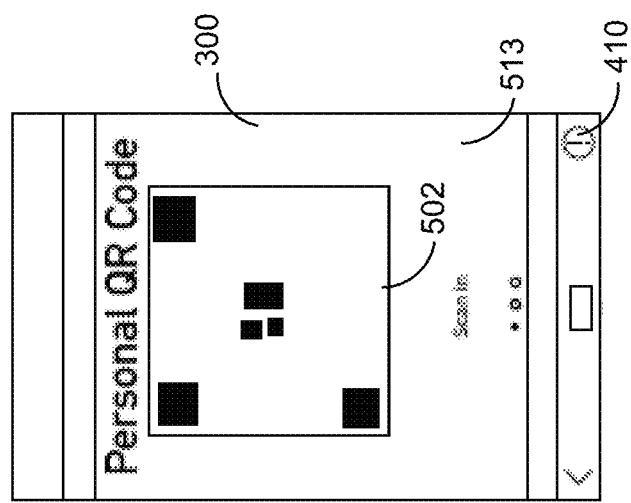
FIGS. 5A-5C are graphical depictions of embodiments of various screens of a graphical user interface unique identifiers for the environment based matching system in accordance with the present disclosure.
Figure 5B:
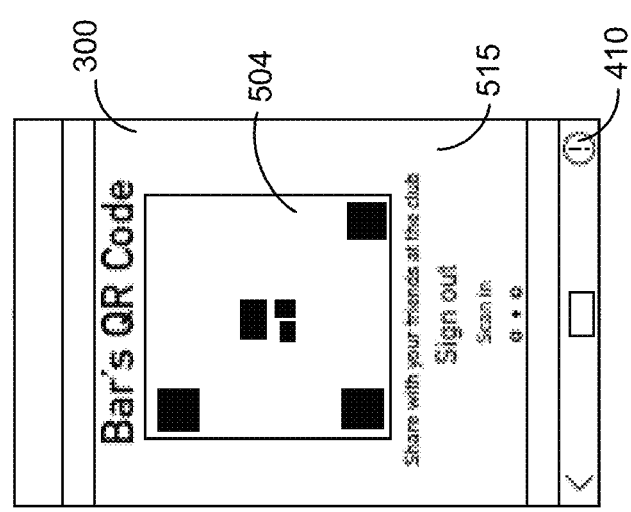
Figure 5C:
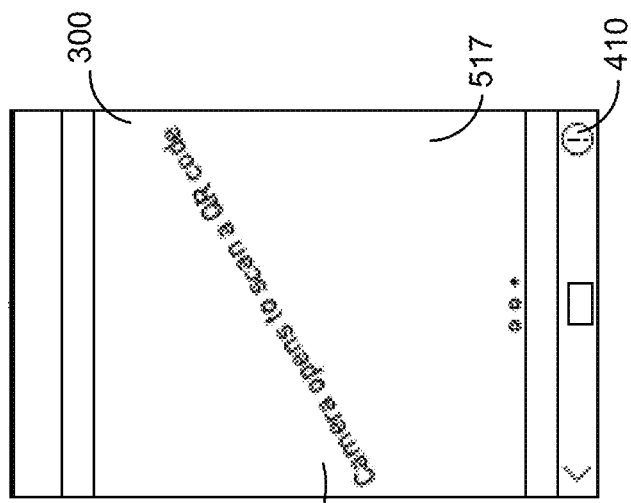

FIGS. 5A-5C are a graphical depiction of embodiments of various screens of GUI 300 generated by the system 120 for accessing unique identifiers, as seen by a user via the app on a second mobile device. FIG. 5A-5C illustrates screens 513, 515, and 517 that may be generated by GUI 300 in response to interacting with QR icon 408 of the home screen. One or more of the screens may automatically be generated in response to interacting with icon 408.

Screen 513 may display a personal unique identifier 502 of the user, illustratively shown as a QR code 502. Screen 515 may display a unique identifier 504 of a social environment (e.g., unique identifier 112 of social environment 100), illustratively shown as a QR code 504. Screen 517 is be used to obtain unique identifiers, for example, within a view finder of the user device. The user may interact (e.g., swipe, scroll, etc.) between screens 513, 515, and 517.

In various embodiments, the personal unique identifier 502 is specific to a respective user and may be automatically generated based on registering with the application 142. The personal unique identifier 502 may be generated by the server 122 and stored in database 124 as part of or otherwise in association with the user profile 134. The personal unique identifier 502 may be static and unchanged. Through associating with the user profile 132, the personal unique identifier 502 may be used to receive food and/or drinks ordered by the user and/or other users for that particular user. Additionally, other users may scan (e.g., via screen 517 generated by the user device of the other user) the personal unique identifier 502 of the user to connect with the user.

Upon scanning the personal unique identifier 502, the scanning device transmits a message to the system 120 including the unique identifier 502. The system 120 may then identify the user 130 using the unique identifier 502, retrieve the corresponding profile 132 and execute functions related thereto. For example, if the unique identifier 502 is received from another user, the system 502 may determine to connect the other user with the user corresponding to the unique identifier 502 and store the match with both profiles. If the unique identifier 502 is received from an staff member of the social environment 100 (e.g., a bar tender, wait staff, etc.), then the system may determine that the unique identifier 502 checks to see if the corresponding user ordered something from the establishment or if something was ordered for the corresponding user by another user. If the corresponding user ordered something, then the system 120 processes payment via a payment method associated with the unique identifier 502. If the unique identifier 502 is used to retrieve something ordered by another user, then the system 120 may determine to connect the corresponding user and the another user as a successful match, as described below in connection to FIG. 5.

As described above, screen 517 can be used to obtain a unique identifier 504 of the social environment. In some embodiments, accessing screen 517 may cause application 142 to use a view finder 506 of camera (e.g., via a camera application of the user device) coupled to the user device for obtaining an image or otherwise scanning a unique identifier positioned within the view finder 506. For example, the view finder 506 may be used to scan unique identifier 112 of social environment 100 at kiosk 110 (or otherwise distributed about the social environment). In response to a user obtaining the unique identifier 504 while present in the social environment, the user device transmits a message to server 122 including the unique identifier 504 (e.g., an image of the QR code, message including a UUID, etc.). The server 122 then determines that the user is presently located within the social environment based on using the unique identifier 504 to identify the social environment. The server 122 then adds the user device to a group of users associated with the identified social environment. The user device may now access public profiles 134 of the other users included in the group.

In various embodiments, the sever 122 may determine that a user 130 is no longer within the social environment based geo-fencing within the user device 140, such as but not limited to, GPS location information, cellular triangulation and the like. The server 122 may receive location information from each user device 140. If location information indicates that the user device 140 is no longer in the social environment (e.g., the GPS location of the user device 140 has moved a set distance from the social environment), the server 122 may determine that the user 130 is no longer in the social environment and automatically remove the user from the group associate with the social environment. In some embodiments, the server 122 may also automatically remove the unique identifier 112 of the social environment from the user device 140. The set distance may be any desired distance, for example, 10 feet, 20 feet, half a mile, etc.

The user can also check out of the social environment from within the app. Checking out of the social environment may include scanning the unique identifier on the way out of the social environment. Checking out may alternatively include manually interacting with the mobile device to select a "check out" option from within the app. In some other embodiments, the app may log the user out after a certain time period due to inactivity.

In various embodiments, the unique identifier 504 may also be stored locally at the user device and displayed at screen 515. If the user has not obtained a unique identifier of a social environment, screen 515 may be blank or include a message indicating that no unique identifiers are stored. Once stored, the application 142 may display the unique identifier 504 at screen 515, which can be used by other users to obtain the unique identifier. Such features may be advantageous, for example, where certain users may be unable to locate the unique identifier and/or do not want to approach the location of the unique identifier for various reasons.

Figure 6A:
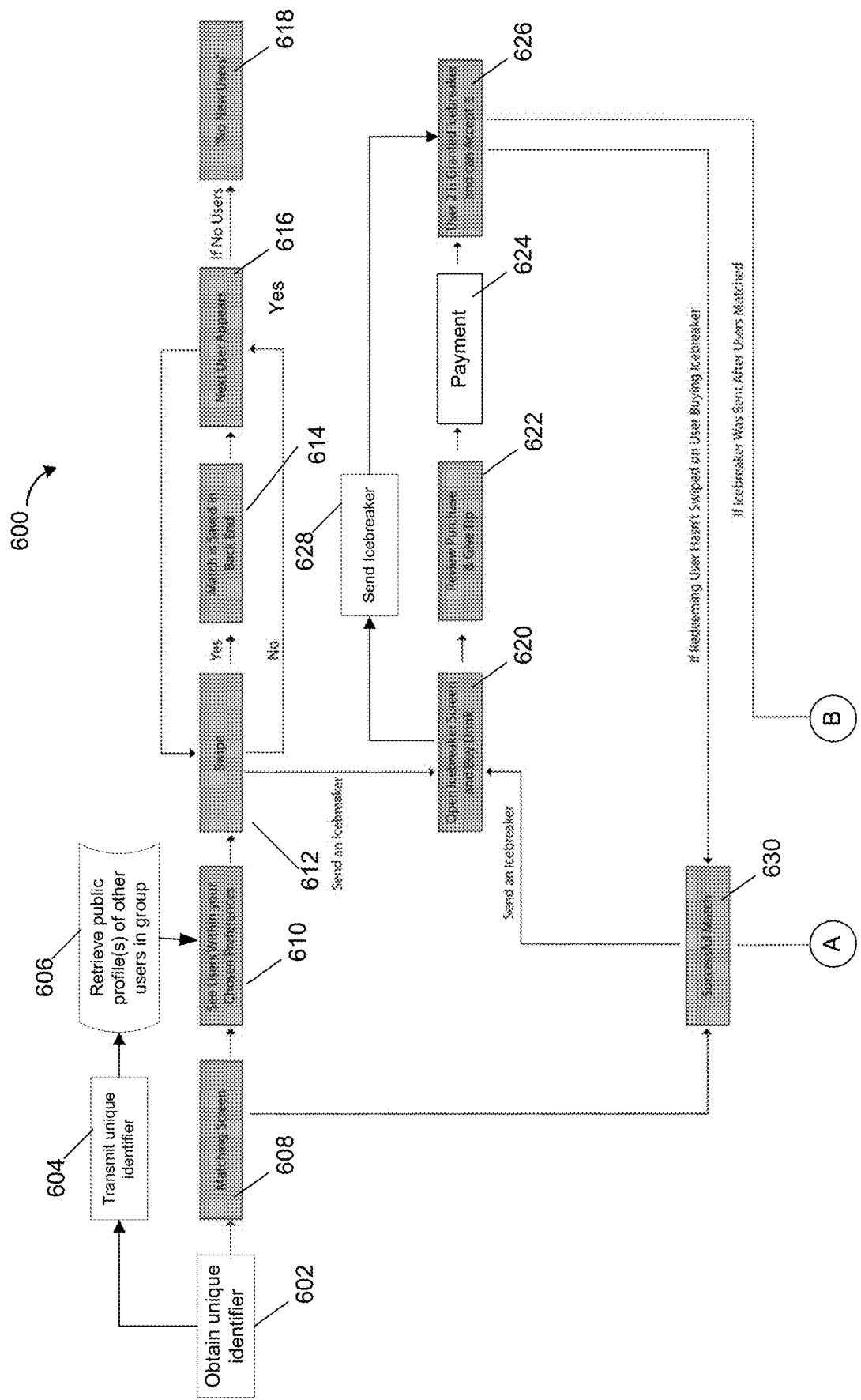
FIGS. 6A and 6B are various flowcharts of methods for connecting user within a social environment using embodiments of the matching system in accordance with the present disclosure.
Figure 6B:
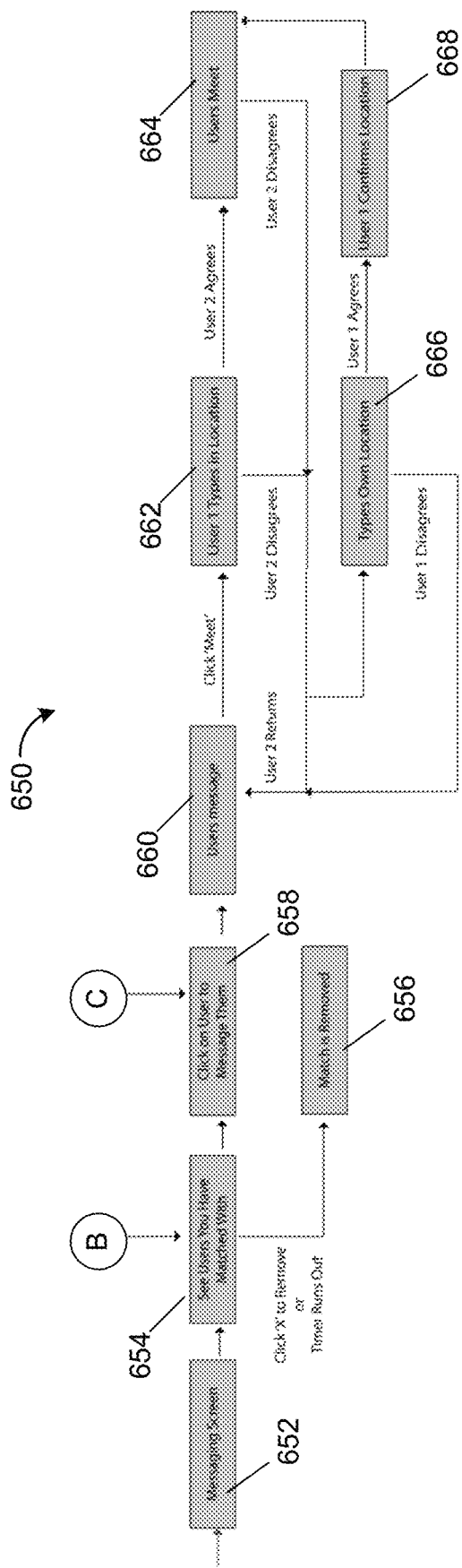
Figure 7A:
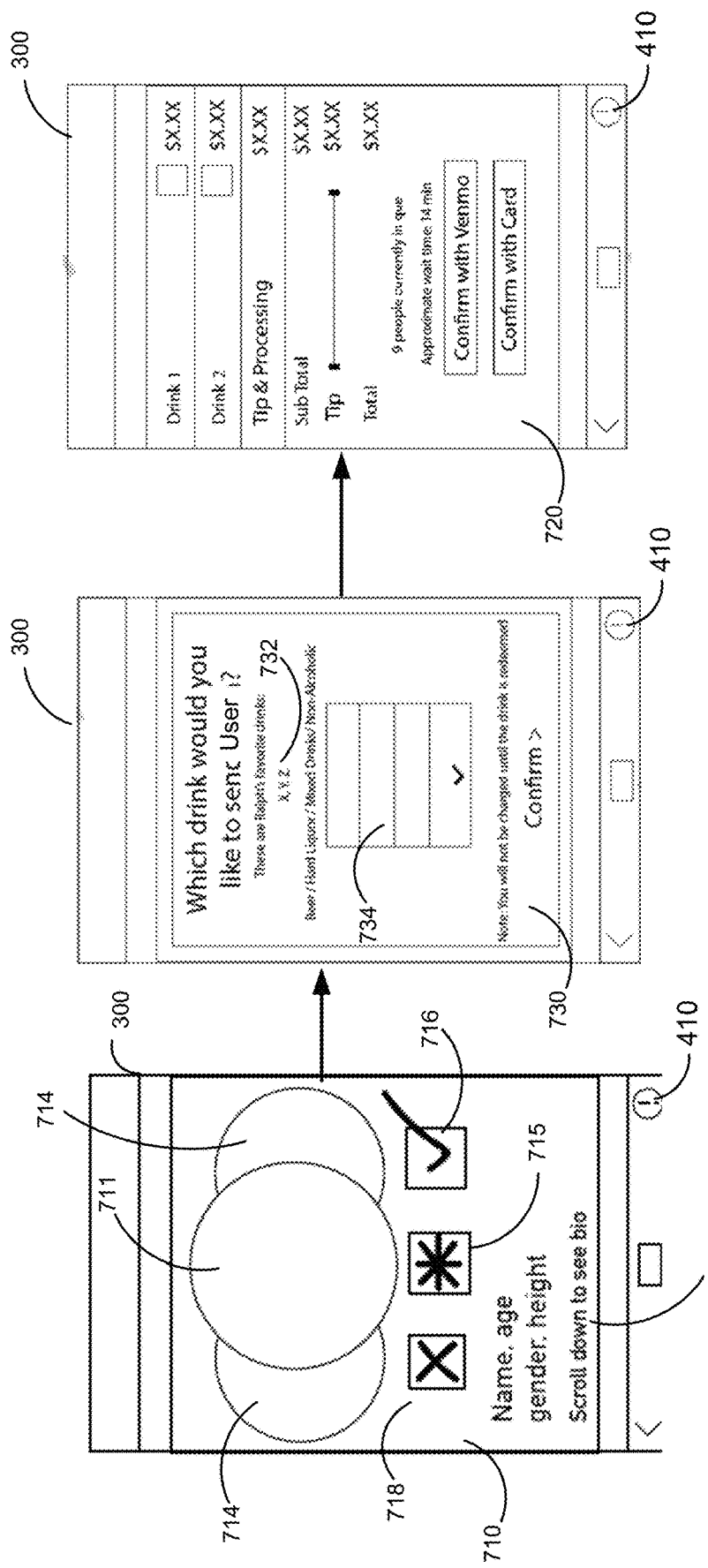
FIGS. 7A and 7B are graphical depictions of embodiments of various screens of a graphical user interface for connecting users using the environment based matching system, as viewed by the user, in accordance with the present disclosure.
Figure 7B:
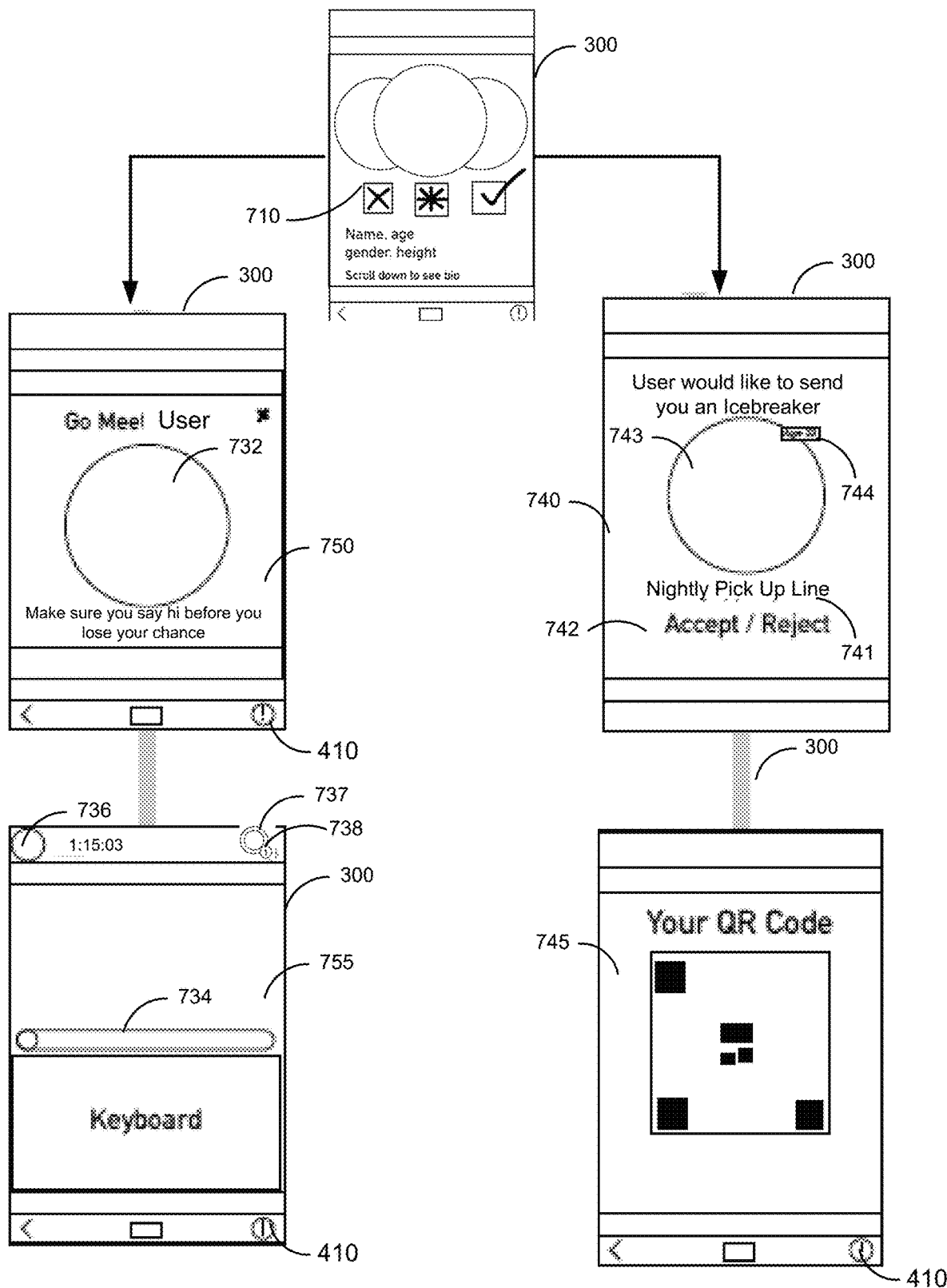
Figure 8:
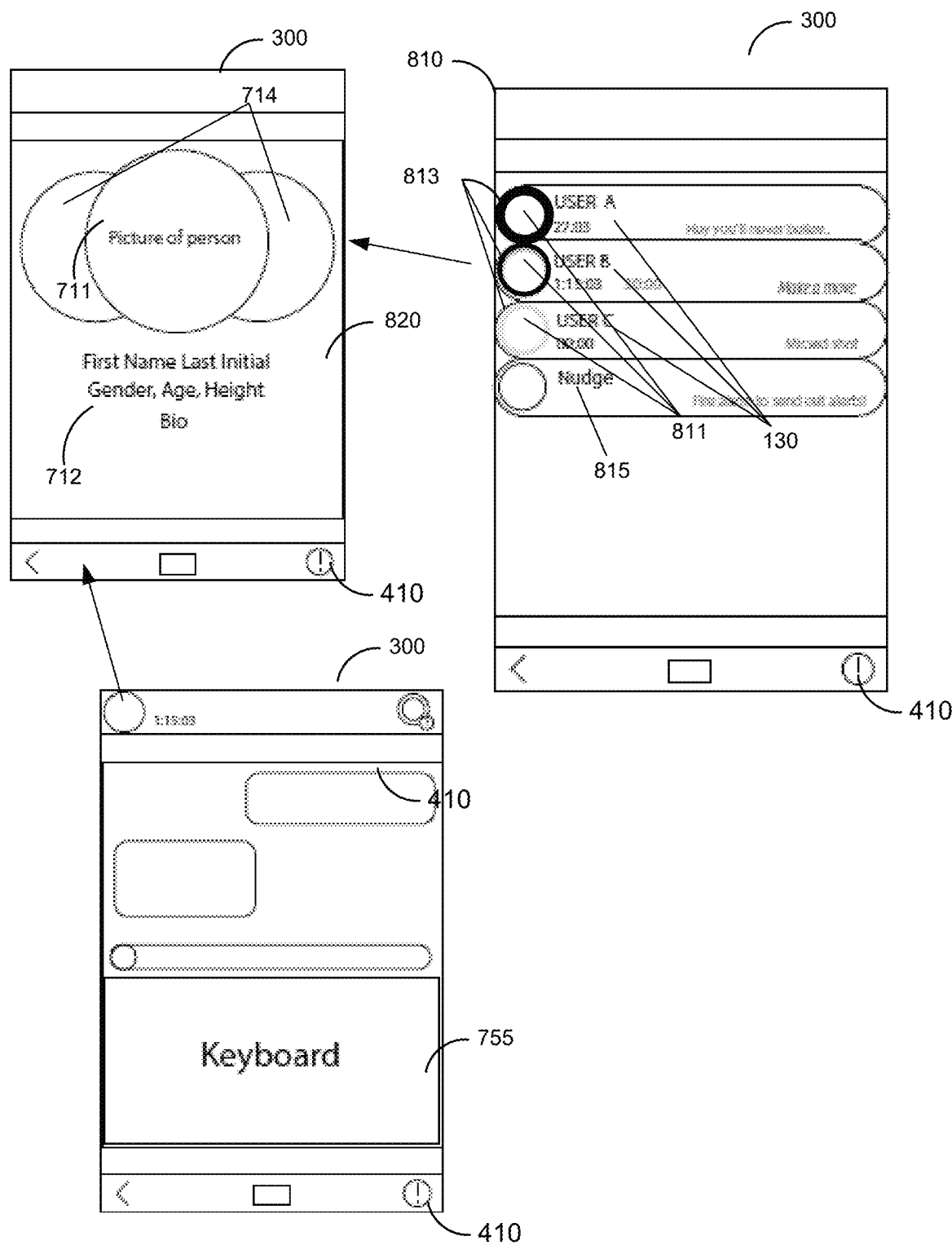
FIG. 8 includes graphical depictions of embodiments of various screens of a graphical user interface for the messaging over the environment based matching system in accordance with the present disclosure.

FIGS. 6A and 6B are example flowcharts of methods for connecting users within a social environment using embodiments of the matching system in accordance with the present disclosure. The methods of FIGS. 6A and 6B may be performed by a one or more devices in a social environment such as the example system 120 and/or user devices 140 illustrated in FIGS. 1A and/or 1B as discussed above. FIGS. 7A, 7B, and 8 are graphical depictions of embodiments of various screens of GUI 300 generated by the system 120 while performing the methods shown in FIGS. 6A and 6B.

Though the methods may be illustrated in a particular sequence, example implementations are not limited to the particular sequence illustrated. Example implementations may include actions and screens being ordered into a different sequence as may be apparent to a person of ordinary skill in the art or actions may be performed in parallel or dynamically, without departing from the scope of the present application.

Turning to method 600 of FIG. 6A, at step 602 a user 130a obtains a unique identifier of a social environment (e.g., unique identifier 112) while present within a social environment using the user device 140a, as described above. For example, the unique identifier may be obtained from a kiosk 110, a broadcasting device 150, another user device 140, and/or distributed within the social environment 100.

At step 604, the user device 140a transmits the unique identifier to the system 120. In various embodiments step 604 may be performed automatically in response to performing step 602. The system 122 may then use the received unique identifier to determine that the user device 140a is located in a social environment corresponding to the received unique identifier, for example, by accessing the database 124. The user device 140a is then added to a group of user devices 140 present in the social environment 110. At step 606, public profiles of other users 130 can be retrieved from database 124.

At step 608, matching functionality of the system 120 can be accessed by the user device 140a. In some embodiments, step 608 may generate a matching screen in response to user interaction with icon 401 on the home screen. An example matching screen is illustrated as screen 710 of FIG. 7A. At step 610, the method displays one or more public profiles 132 of the others users 130 in the group. In various embodiments, the one or more public profiles 132 are displayed in an order based on information about user 130a preferences included in the user profile. For example, the system 120 ranks each user 130 in the group against each other user based on information in the user profile, higher rankings are provided to those users having greater number of similar information, to provide a higher likelihood of a match. The public profiles 132 of the other users in the group may be provided to the user device 140a in accordance with the ranked order, such that users having higher rank are displayed before users having a lower rank.

At step 612, user 130a can review the displayed user(s) 130 and interact with the matching screen to another user as a match or indicate no interest. In various embodiments, the user may execute a swipe operation (or select an icon displayed on the screen) that indicates a match or not at that the application 142 processes based on the indication. For example, if the user 130a swipes to accept the match, the user device 140a transmits instructions to the server 122 to save the user (e.g., user 130b) corresponding to the selected public profile 132b as a match in the user profile 132a of the user 130a. If the user 130a swipes to decline the match, the system 120 may save such to refine future match rankings. The system 122 may also remove the declined user from the list of users 130 to be displayed. After the user 130a has swiped either "Yes" or "No," the system displays the next public profile at step 616. The method 600 repeats steps 612-516 until there are no further public profiles in the group, at which point the process ends at step 618.

In some embodiments, the system 120 may include a cool down time between one or more swipes. The cool down time may be a period of time during which the user 130a can no longer browse or swipe through potential matches. The cool down time may be static in some embodiments or adjustable based, for example, on the number of successful matches, the number of services ordered, etc. For example, if a user 130a has numerous unsuccessful matches the cool down time may be increased. As another example, the cool down time may be decreased if the user sends orders a number of services.

At step 620, the user device 140a may provide one or more "conversation starter options" (also referred to as "icebreaker options") to the user 130a. For example, the system may execute an icebreaker functionality which includes the application may generate an introduction request screen (sometimes referred to herein as an icebreaker screen) for generating an introduction request message to be sent to a selected user 130b. An example introduction request screen is illustrated as screens 720 and 730 of FIG. 7A. For example, after selecting "Yes" on a public profile 134b of a user 130b, the user device 140a may prompt the user 130a to send an introduction request message at step 620. In another example, the user 130a may access the introduction request screen from Request services icon 409 and select a previously saved matched user 130b to send an introduction request. The introduction request screen may present selectable options for breaking the ice with the selected second user 1320b. Introduction requests may include, but not limited to, requesting services from the social environment, for example, placing an order drinks, food, or other consumer goods to be completed by the staff of the social environment. At steps 620 and 622 the user 130a may select one or more services from the introduction request screen, review the order, and pay for services (e.g., via payment methods included in the user profile 132a). The user device 140a then sends the request to server 122. The server 122 at least verifies payment instructions and transmits a service request message including the order and personal unique identifier of the selected user 130b to the social environment 100. Payment may be processed at step 624 or processed following step 626 as described below. In some embodiments, an introduction request may comprise text, audio data, and/or image data as an introduction or conversation starter (e.g., a message to the user 130b) without purchasing any services (e.g., step 628). In either scenario, the introduction request is an attempt to break the ice between user 130a and 130b.

At step 626, the server 122 transmits an introduction message to the user device 140b of the user 130b as part of the icebreaker functionality. In some embodiments, the server 122 forwards the introduction request as the introduction message to the second user 130b, while in another embodiment the server 122 repackages the introduction request to an introduction message. In some embodiments, at step 626 the user device 140b receives the introduction message and the application 142b generates an introduction message screen. An example introduction message screen is illustrated as screen 740 of FIG. 7B. The introduction message screen may be generated in response to receiving the message from the server 122. In an example, the application 142b may generate a popup notification generated on the user device 140b through which the user 130b may access the introduction message screen. In any case, the introduction message serves to break the ice with second user 130b and start a conversation.

If the second user 130b accepts the introduction message via the user device 140b, the user device 140b sends an acceptance message to the servicer 122). The server 122 then saves the connection (e.g., match) in the data based 124 as a successful match (step 630). For example, the connection may be saved in both user profiles 132a and 134b. Alternatively, if the user 130b is already stored as a successful match prior to step 626, the method proceeds to point B. If the second user 130b accepts the introduction message, the second user 130b may use the corresponding personal unique identifier to retrieve the services (if any) from the social environment. For example, if the first user 130a ordered the second user 130b a drink at steps 620-624, the drink will be prepared and held for second user 130b who presents the unique identifier to retrieve the drink. In some embodiments, in response to receiving the acceptance message, the server 122 may then process and finalize payment from step 624. In this way, the first user 130a is not charged for the requested services until they are accepted by the second user 130b.

If the second user 120b rejects the introduction message, the server 122 removes the second user 130b from the first users profile (e.g., as stored in step 614) and the process ends.

As an illustrative example, FIG. 7A provides various screens of the GUI 300 generated as part of method 600, as described above. Screen 710 illustrates an example matching screen. Matching screen 710 includes a displayed public profile 712 of a given user 130 as a result of step 610. The user may be able to scroll through the entire public profile. In a first instance, the displayed profile 712 may be the highest rated match of the user 130a, while in subsequent instances the displayed profile 712 may be based on swiping operations of steps 612-616. Screen 710 may also include image 711 of the displayed public profile 712, for example the nightly picture of the displayed profile 712. The screen 710 may also include images 714. In one embodiment images 714 are images of the displayed public profile that user 130a may scroll through. Alternatively, images 714 may be a previously viewed public profile and/or a next public profile. Screen 710 may also include a reject button 718 and an accept button 716 that may be used in place of a swiping operation. Screen 710 may also include an introduction request button for initiating step 620 from screen 710 and/or a meet up button for arranging an in person meeting (e.g., starting a conversation and/or sending an icebreaker). Either operation may be mapped to button 715, which may be one or more buttons.

Screen 710 may include users 130 connected with user 130a (e.g., successful matches) and/or users 130 whom user 130a has not rejected or that have not rejected user 130a. Thus, screen 710 may function as a list of existing connections and possible connections with other users in the social environment.

At step 620, screen 730 may be generated an introduction request to initiate the icebreaker functionality. In the illustrative example of FIG. 7A, user 130a may select services (e.g., drinks) for purchasing for second user 130b. Other services may be used in place of or along with (e.g., food, etc.). Screen 730 may display the services preferences 732 of the second user 130b from public profile 134b (e.g., favorite drinks). Requested services may be entered into fields 734 via keyboard, pull down menu, etc. Once the services are entered, the application 142 may generate screen 720, where a user can finalize the order and confirm a method of payment.

FIG. 7B illustrates additional screens of the GUI 300 generated as part of method 600, as described above. For example, from screen 710, user device 140b of the second user 130b receives the introduction message (e.g., step 626) which causes the application 142b to generate screen 740. Screen 740 may be an example of an introduction message from user 130a in an attempt to break the ice. Screen 740 may include some of the information from the public profile of user 130a, such as, user's 130a nightly picture 743 and age 744. Screen 740 may also include text 741. User 130a may interaction with button 742 to accept or reject the introduction message.

If accepted, user 130b may use their personal unique identifier to retrieve the services (e.g., screen 745). Screen 745 may be generated in response to accepting the introduction message and/or accessed via icon 408 of home screen 400. In response to user 130b accepting the introduction message, the server 122 sends an acceptance message to user device 140a notifying user 130a that user 130b accepted the introduction message. In some embodiments, when the user accepts the introduction message, a timer will be started and displayed so that the user knows when to pick up their drink. The user's public profile is forward to staff of the social environment (e.g., bartenders) and a listing of the accepted services. Upon scanning the personal unique identifier (e.g., at a kiosk and/or at the bar), staff of the social environment may complete the order (e.g., prepare the drinks).

Screen 750 illustrates a meet up screen. Screen 750 may be accessed from the matching screen through selecting a meet up operation (e.g., button 715). Screen 750 may also be generated in response to user 130b accepting the introduction message, thereby prompting user 130a to meet user 130b in person. Screen 750 may include image 752 from the public profile of user 130b. User 130a may interact with screen 750 to generate message interface screen 755 for messaging user 130b. Messaging interface screen 755 may facilitate text message (e.g., SMS, MMS, etc.) and/or instant messaging services for exchanging messages with other users. Screen 755 includes a text window 754 and message stream. Screen 755 may comprise an image 752 in a reduced size and a message indicator 737 including a number 738 of messages. The message indicator 737 may include an image of another user 130c and a graphical indicator indicative of whether user 130c is matched to user 130a, as described below.

Turning to method 650 of FIG. 6B, at step 652 messaging functionality of system 120 may be accessed by the user device 140a. In some embodiments, step 652 may generate a user connection screen in response to user interaction with icon 403 on the home screen 400. An example user connection screen is illustrated as screen 810 and/or 830 of FIG. 8. At step 654, the method displays one or more users 130 that have been successfully matched to user 130a (e.g., from step 630 and/or retrieved from database 124). At step 658, the GUI 300 may generate a messaging interface screen in response to a user selecting a displayed user from the user connection. Example message interface screens are illustratively shown as screen 755 of FIGS. 7B and/or 8, which may be used to send and receive messages in the form of SMS, MMS, or internet based messaging services.

In some embodiments, the messaging interface screen may be generated in response to the second user 130b accepting the introduction message at step 626 (e.g., as described above in connection to FIG. 7B).

At step 660, the user may send a message to another user 130c, which may be user 130b from method 600 or another user 130 that user 130a is already matched to. For example, the message at step 660 may include an invitation to meet and the users can negotiate a location to meet via steps 660-668.

In various embodiments, the users populated at step 664 may be restricted to those users that user 130a is connected to and are located at the social environment (e.g., part of the group described above). Thereby providing the user 130a an easy and simplified means to sort through contacts and locate persons who user 130a is matched with and are located at the same social environment.

As an illustrative example, FIG. 8 provides various screens of the GUI 300 generated as part of method 650, as described above. Screen 810 illustrates an example user connection screen. User connection screen 810 includes a graphical representation of a plurality of users 130. The users 130 may be connected to user 130a (e.g., User A), in the process of connecting (e.g., introduction request sent and waiting for response) (e.g., User B), and/or a connection has been attempted and rejected by the user (e.g., User C). Each user 130 is displayed with an image 811 from their respective public profile, for example, their nightly pictures in an example implementation. Screen 810 also illustrates an example message all button 815, whereby user 130*a* may interact with button 815 to send a message to all connected users. In various embodiments user connection screen 810 graphically displays all users 130 connected to user 130*a* that are in the social environment. Also illustrated in screen 810 are graphical indicators 813 associated with each image 811 that are representative of a connection status between each corresponding user 130 and user 130*a*. For example, rings of different graphical attributes (e.g., colored, hatched, or dotted) may be generated around images 811 indicating that status. In the illustrative example, user A is connected to user 130*a* (e.g., shown by a thick black ring), user 130*a* has indicated a match with user B but is awaiting further action (e.g., shown by a medium black ring), and user C has rejected the connection request (e.g., shown with a thin grey ring).

Message interface screen 755 may be generated in response to selecting a user 130 (e.g., User B in screen 810) for messaging with the selected user. Message interface 755 of FIG. 8 may be substantially similar to message interface screen of FIG. 7B.

Screen 820 graphically displays the public profile of a given user 130. For example, screen 820 may be generated in response to interacting with the image 811 of a given user (e.g., user C in the example of FIG. 8). As another example, the screen 820 may be generated in response to interacting with image 736 of screen 755. Screen 820 may display the public profile 712 and the images 712, 714 of the selected user 130, as described above in connection to FIG. 7A.

In various embodiments, the system 120 may take advantage of using the unique identifier of the social environment to preform various other functions.

An example functionality is an ability for a user to order services on their own behalf via application 142. Similar to the introduction request described above in connection to FIG. 6, a user may order services for themselves via services icon 409 on the home screen. Once selected, the application 142 generates screens similar to screen 720 and 730, but the order is for the user operating the device and not for a second user. Once the order is placed and confirmed, the process proceeds as described above in connection to FIGS. 6A and 7A. However, the ordering user will present their own unique identifier to the kiosk and/or staff member.

Figure 9:
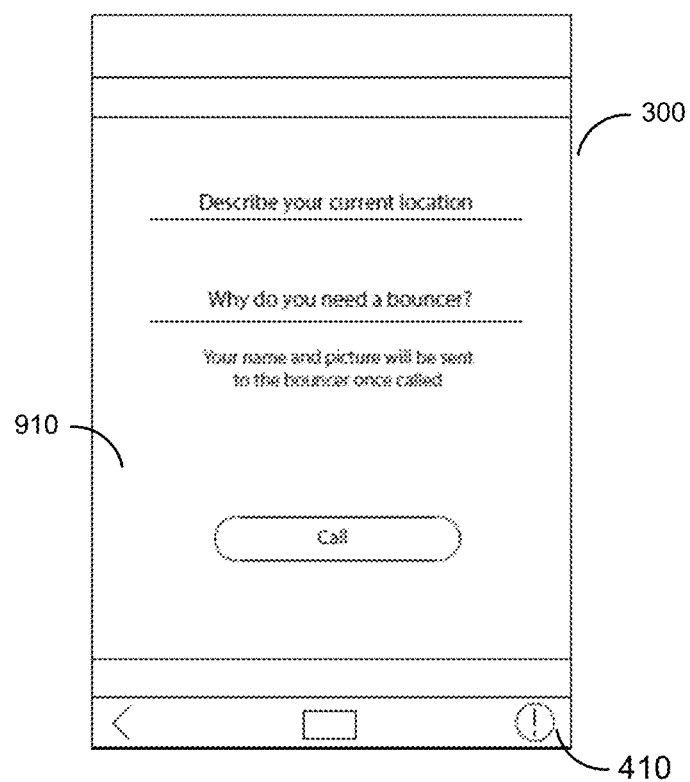
FIG. 9 is a graphical depictions of an embodiment of an alert screen of a graphical user interface for the environment based matching system in accordance with the present disclosure.

Another example functionality offered by the system 120 is that a user may flag a second user based on an uncomfortable interaction, as described above in connection to FIG. 2. For example, if one user does or says something to offend or discomfort another user, a user may interact with "flag" function from the home screen (e.g., as icon 410) to generate an alert screen for requesting assistance. For example, screen 910 of FIG. 9 illustrates a graphical depiction of an embodiment of an alert screen of a GUI 300 generated by the system 120, as seen by a user via an app on a first mobile device.

At the alert screen 910, the offended user may indicate their current location, for example, through text entry and/or drop down menu of locations in the social environment. A description of what the offending user is doing (e.g., why the offended user needs a bouncer or other assistance). Once confirmed, the user device transmits an alert message to the server 122. The alert message may include portions of the offended user's public profile and the information entered by the user. The alert message may also include information about the offender (e.g., a description) and if the offender has a user profile 134, then the alert may be associated with said profile. In some embodiments, a cool down time may be increased based on an alert added to the profile. The server 122 may then forward the alert message to staff within the social environment 100 (e.g., management, bouncers, security, etc.). This will allow the staff to take remedial action as needed. In some examples, if a user receives a predetermined number of strikes over a specified amount of time, their account can be locked and/or blacklisted, making it unusable following a review.

Another example functionality offered by the system 120 is users 130 may be forwarded promotions based on obtaining the unique identifier of the social environment. For example, once user device obtains the unique identifier of the social environment, the server may forward promotions corresponding to the social environment, which the user may be able to search through. The promotions may include promotions for multiple days (e.g., all promotions on the calendar) and the user may be able to swipe through each day. The promotions may be stored in the database 124, for example, in the profile of the social environment.

Other example functionality includes, but are not limited to:

Wildcards: users 130 are "matched" with a random user 130 that is located at the same social environment. The random user 130 may choose to accept the wildcard or not. In some embodiments, upon accepting both users may be locked into message exchange until they meet or cancel the match. In some implementations, the random match may be the user within the social environment having the highest likelihood of matched based on shared interested contained in the user's profiles.

A Masquerade feature, for example, where all information of the public profile is hidden and the user can only see other's users manually entered biography. Thus, uploaded pictures and other identifying information may be hidden.

Figure 10:
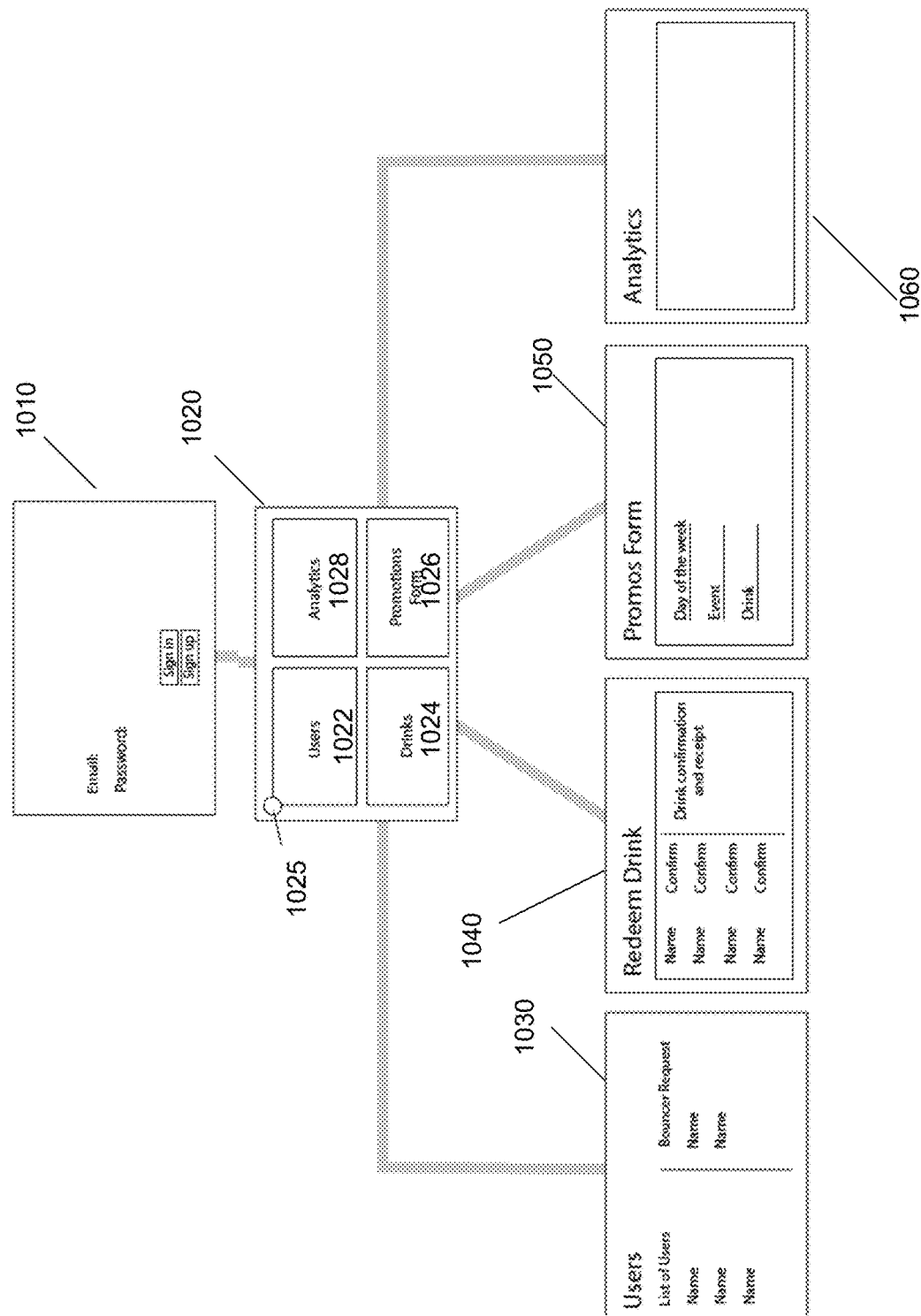
FIG. 10 includes graphical depictions of embodiments of various screens of a graphical user interface of the environment based matching system, as viewed by an vendor of the social environment, in accordance with the present disclosure.

A reward system based on number of times a unique identifier is obtained by a single user. For example, if a user 130*a* visits the same social environment a certain number of times (e.g., obtains the unique identifier a number of times) within a set amount of time (e.g., days, weeks, months, etc. as desired) and/or purchasing a number of services within the set time, the user may be provided certain rewards. Rewards may include services incentives such as discounts and services, less cool down time between swipes, etc. In some embodiments, the application may include incentives, such as a user ordered more services via the application, the cool down time between swipes may be reduced FIG. 10 is graphical depiction of embodiments of various screens of a graphical user interface of the environment based matching system, as viewed by a vendor of the social environment, in accordance with the present disclosure. The vendor (or staff) may be a user 130 operating a user device, which may be similar to user device 140 except that it executes a vender application as described herein. The various screens of FIG. 10 may be generated by either the application 126 and/or a vendor application (thinly or thick), as described above, and displayed on a display 146 of the user device 140.

At screen 1010, staff of the social environment may sign into the system 120, for example using a username and authenticating credentials. The database 124 may store a plurality of profiles, each corresponding to a social environment. The profiles may be similar to user profile 132 and include name of the social environment and a location thereof. Furthermore, the profile may include historical record of users 130 who have been visited the social environment, records of requested services (e.g., drink orders), correspondence between users and drink orders, promotion information, etc. Each profile may be stored in association with a corresponding unique identifiers.

Once signed in, screen 1020 is generated including links 1022, 1024, 1026, and 1028 for accessing a users screen 1030, a services screen 1040, a promotion screen 1050, and an analytics screen 1070, respectively. Screen 1020 may also include drop down menu button 1025 for accessing staff profile information for processing payments and tips thereto. User screen 1030 may provide a list of users who have obtained the unique identifier for the social environment. In some embodiments, the user screen 1030 may include alert messages associated with the public profile of the requesting user (e.g., as described above in connection to FIG. 9). Service screen 1040 includes a listing of requested services associated with the public profile for the user who will be accepting the services (e.g., which user will be providing their unique identifier). The service screen 1040 may also include an indication of whether payment has been processed or not. The social environment (e.g., staff members) may post, create, edit, and delete promotions using the promotions screen 1050, which are uploaded to their respective profile. Analytics screen 1060 displays how many users 130 have entered the venue at a certain point, how much users have ordered services, income received from services, and how many users have matched. Analytics screen 1060 may also provide how many users have requested assistance and how many times an alert message has been made against a given user.

Figure 11:
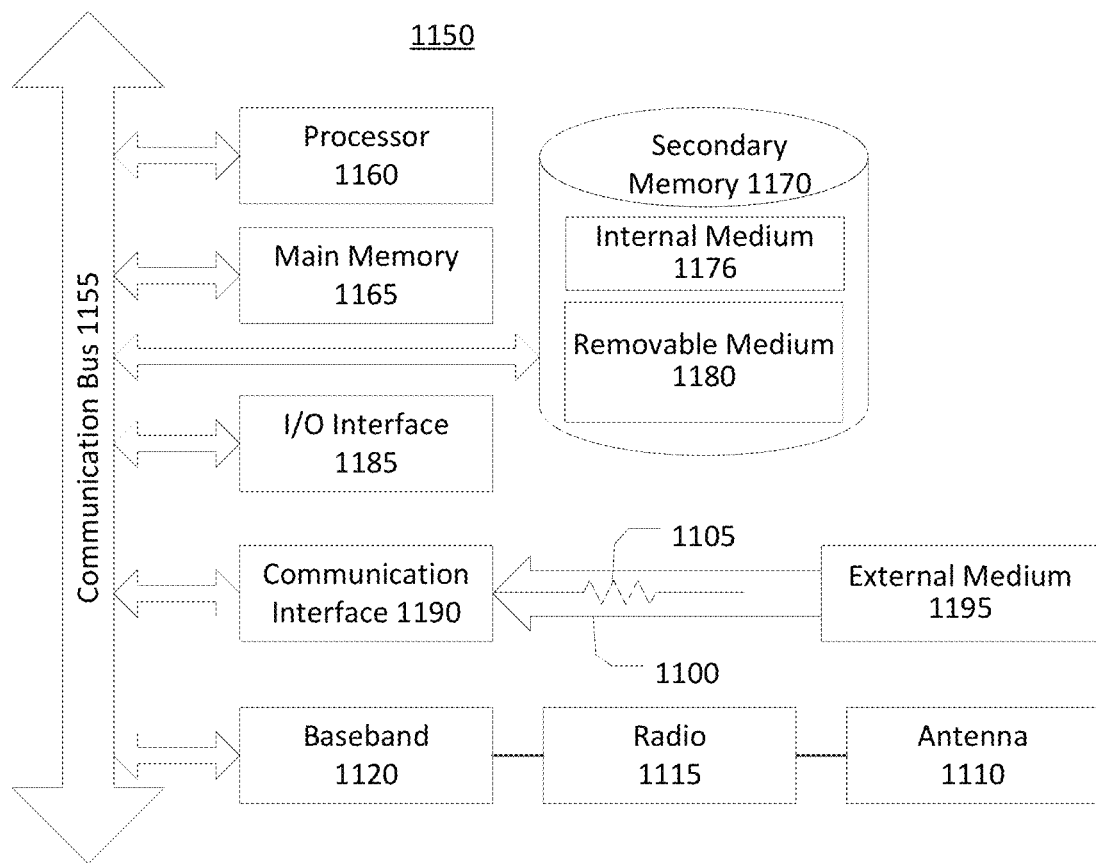
FIG. 11 is a functional block diagram of an example computing device for performing methods associated with the system of FIGS. 1A and/or 1B in accordance with the present disclosure.

FIG. 11 is a functional block diagram of an example computing device for performing methods associated with the system of FIG. 1. For example a system 1150 can be used as or in conjunction with one or more of the user devices 140, the server 122, the system 120, or equivalent platforms, devices, or processes (e.g., the methods 200, 600, and 650) described above. Further, the system 1150 may represent components of devices 140, the server 122, the system 100, and/or other devices described herein. The system 1150 can be a server, a mobile device, or any conventional personal computer, or any other processor-enabled device that is capable of wired or wireless data communication. Other computer systems and/or architectures may be also used, as will be clear to those skilled in the art.

The system 1150 preferably includes one or more processors, such as processor 1160. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 1160. Examples of processors which may be used with system 1150 include, without limitation, the Pentium® processor, Core i7® processor, and Xeon® processor, all of which are available from Intel Corporation of Santa Clara, Calif.

The processor 1160 is preferably connected to a communication bus 1155. The communication bus 1155 may include a data channel for facilitating information transfer between storage and other peripheral components of the system 1150. The communication bus 1155 further may provide a set of signals used for communication with the processor 1160, including a data bus, address bus, and control bus (not shown). The communication bus 1155 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 1196/S-100, and the like.

System 1150 preferably includes a main memory 1165 and may also include a secondary memory 1170. The main memory 1165 provides storage of instructions and data for programs executing on the processor 1160, such as one or more of the functions and/or modules discussed above. It should be understood that programs stored in the memory and executed by processor 1160 may be written and/or compiled according to any suitable language, including without limitation C/C++, Java, JavaScript, Pearl, Visual Basic, .NET, and the like. The main memory 1165 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 1170 may optionally include an internal memory 1175 and/or a removable medium 1180, for example a floppy disk drive, a magnetic tape drive, a compact disc (CD) drive, a digital versatile disc (DVD) drive, other optical drive, a flash memory drive, etc. The removable medium 1180 is read from and/or written to in a well-known manner. Removable storage medium 1180 may be, for example, a floppy disk, magnetic tape, CD, DVD, SD card, etc.

The removable storage medium 1180 is a non-transitory computer-readable medium having stored thereon computer executable code (i.e., software) and/or data. The computer software or data stored on the removable storage medium 1180 is read into the system 1150 for execution by the processor 1160.

In alternative embodiments, secondary memory 1170 may include other similar means for allowing computer programs or other data or instructions to be loaded into the system 1150. Such means may include, for example, an external storage medium 1195 and an interface 1190. Examples of external storage medium 1195 may include an external hard disk drive or an external optical drive, or and external magneto-optical drive.

Other examples of secondary memory 1170 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 1180 and communication interface 1190, which allow software and data to be transferred from an external medium 1195 to the system 1150.

System 1150 may include a communication interface 1190. The communication interface 1190 allows software and data to be transferred between system 1150 and external devices (e.g. printers), networks, or information sources. For example, computer software or executable code may be transferred to system 1150 from a network server via communication interface 1190. Examples of communication interface 1190 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 1150 with a network or another computing device.

Communication interface 1190 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 1190 are generally in the form of electrical communication signals 1105. These signals 1105 are preferably provided to communication interface 1190 via a communication channel 1100. In one embodiment, the communication channel 1100 may be a wired or wireless network, or any variety of other communication links. Communication channel 1100 carries signals 1105 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 1165 and/or the secondary memory 1170. Computer programs can also be received via communication interface 1190 and stored in the main memory 1165 and/or the secondary memory 1170. Such computer programs, when executed, enable the system 1150 to perform the various functions of the present invention as previously described.

In this description, the term "computer readable medium" is used to refer to any non-transitory computer readable storage media used to provide computer executable code (e.g., software and computer programs) to the system 1150. Examples of these media include main memory 1165, secondary memory 1170 (including internal memory 1175, removable medium 1180, and external storage medium 1195), and any peripheral device communicatively coupled with communication interface 1190 (including a network information server or other network device). These non-transitory computer readable mediums are means for providing executable code, programming instructions, and software to the system 1150.

In an embodiment that is implemented using software, the software may be stored on a computer readable medium and loaded into the system 1150 by way of removable medium 1180, I/O interface 1185, or communication interface 1190. In such an embodiment, the software is loaded into the system 1150 in the form of electrical communication signals 1105. The software, when executed by the processor 1160, preferably causes the processor 1160 to perform the inventive features and functions previously described herein.

In an embodiment, I/O interface 1185 provides an interface between one or more components of system 1150 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 1150 also includes optional wireless communication components that facilitate wireless communication over a voice and over a data network. The wireless communication components comprise an antenna system 1110, a radio system 1115 and a baseband system 1120. In the system 1150, radio frequency (RF) signals are transmitted and received over the air by the antenna system 1110 under the management of the radio system 1115.

In one embodiment, the antenna system 1110 may comprise one or more antennae and one or more multiplexors (not shown) that perform a switching function to provide the antenna system 1110 with transmit and receive signal paths. In the receive path, received RF signals can be coupled from a multiplexor to a low noise amplifier (not shown) that amplifies the received RF signal and sends the amplified signal to the radio system 1115.

In alternative embodiments, the radio system 1115 may comprise one or more radios that are configured to communicate over various frequencies. In one embodiment, the radio system 1115 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 1115 to the baseband system 1120.

If the received signal contains audio information, then baseband system 1120 decodes the signal and converts it to an analog signal. Then the signal is amplified and sent to a speaker. The baseband system 1120 also receives analog audio signals from a microphone. These analog audio signals are converted to digital signals and encoded by the baseband system 1120. The baseband system 1120 also codes the digital signals for transmission and generates a baseband transmit audio signal that is routed to the modulator portion of the radio system 1115. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 1110 where the signal is switched to the antenna port for transmission.

The baseband system 1120 is also communicatively coupled with the processor 1160. The central processing unit 1160 has access to data storage areas 1165 and 1170. The central processing unit 1160 is preferably configured to execute instructions (i.e., computer programs or software) that can be stored in the memory 1165 or the secondary memory 1170. Computer programs can also be received from the baseband processor 1110 and stored in the data storage area 1165 or in secondary memory 1170, or executed upon receipt. Such computer programs, when executed, enable the system 1150 to perform the various functions of the present invention as previously described. For example, data storage areas 1165 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A method for connecting users in a social environment, the method comprising:
    storing, by a server, a plurality of user profiles in a database, the plurality of user profiles including identity information related to a respective user of a plurality of users for each user profile of the plurality of user profiles;
    storing, by the server, a public profile for each respective user, each public profile including information viewable by other users;
    receiving a message from a first user device associated with a first user profile of the plurality of user profiles, the first user profile corresponding to a first user, the message including a unique identifier of the social environment that is obtained by the first user device while within the social environment;
    receiving messages from one or more user devices, each message including the unique identifier obtained by the one or more user devices of one or more users of the plurality of users while within the social environment;
    determining the first user is located within the social environment based on the unique identifier;
    identifying one or more public profiles associated with the one or more users of the plurality of users located within the social environment, wherein identifying the one or more public profiles is based on using the unique identifier included in each message from the one or more user devices to associate at least the one or more public profiles of the one or more users with the social environment; and
    matching at least a second user of the one or more users with the first user based at least in part on a public profile of the second user and the first user profile and transmitting information related to the public profile of the second user to the first user device.

2. The method of claim 1, wherein the unique identifier is associated with a kiosk located at the social environment.

3. The method of claim 1, wherein the first user device receives the unique identifier from another device within the social environment.

4. The method of claim 1, wherein the first user device transmits the message while physically located within the social environment.

5. The method of claim 1, wherein each of the plurality of user profiles for a respective user comprises the public profile for the respective user.

6. The method of claim 1, wherein the social environment is at least one of a bar, club, lounge, restaurant, entertainment venue, park, and festival.

7. The method of claim 1, wherein the unique identifier is at least one of a bar code, a QR code, and a universal unique identifier.

8. The method of claim 1, further comprising forwarding an introduction message from the first user device to a second user device associated with the public profile of the second user based on matching and storing the public profile of the second user in association with the first user profile in response to the second user device accepting the introduction message.

9. The method of claim 8, further comprising receiving an acceptance message from the second user device comprising a unique identifier of the second user and storing the public profile of the second user in association with the first user profile in response to receiving the acceptance message.

10. The method of claim 8, further comprising receiving an introduction request comprising a request for service and information of the public profile of the second user and forwarding the introduction message to the second user device in response to receiving the introduction request.

11. The method of claim 1, further comprising forwarding an alert message received from the first user device to a device of the social environment to direct a staff member of the social environment to a location included in the alert message.

12. A matching system for connecting users in a social environment, the system comprising:
    at least one database for storing:
        a plurality of user profiles, the plurality of user profiles including identity information related to a respective user of a plurality of users for each user profile of the plurality of user profiles,
        a public profile for each respective user, each public profile including information viewable by other users, and
        a plurality of unique identifiers corresponding to a plurality of social environments;
    a server comprising one or more processors coupled to the database, the server configured to execute instructions stored in a memory to:
        receive a message from a first user device associated with a first user profile of the plurality of user profiles, the first user profile corresponding to a first user, the message including a unique identifier of a social environment that is obtained by the first user device while within the social environment;
        receive messages from one or more user devices, each message including the unique identifier obtained by the one or more user devices of the one or more users of the plurality of users while within the social environment;
        determine the first user is located within the social environment based on the unique identifier;
        identify one or more public profiles associated with the one or more users of the plurality of users located within the social environment, wherein identifying the one or more public profiles is based on using the unique identifier included in each message from the one or more user devices to associate at least the one or more public profiles of the one or more users with the social environment; and
        match at least a second user of the one or more users with the first user based at least in part on a public profile of the second user and the first user profile and transmitting information related to the public profile of the second user to the first user device.

13. The system of claim 12, wherein the unique identifier is associated with a kiosk located at the social environment.

14. The system of claim 12, wherein the first user device transmits the message while physically located within the social environment.

15. A non-transitory computer readable medium, storing instructions for connecting users in a social environment, the instructions comprising:
    storing a plurality of user profiles in a database, the plurality of user profiles including identity information related to a respective user of a plurality of users for each user profile of the plurality of user profiles;
    storing a public profile for each respective user, each public profile including information viewable by other users;
    receiving a message from a first user device associated with a first user profile of the plurality of user profiles, the first user profile corresponding to a first user, the message including a unique identifier of the social environment that is obtained by the first user device while within the social environment;
    receiving messages from one or more user devices, each message including the unique identifier obtained by the one or more user devices of one or more users of the plurality of users while within the social environment;
    determining the first user is located within the social environment based on the unique identifier;
    identifying one or more public profiles associated with the one or more users of the plurality of users located within the social environment, wherein identifying the one or more public profiles is based on using the unique identifier included in each message from the one or more user devices to associate at least the one or more public profiles of the one or more users with the social environment; and
    matching at least a second user of the one or more users with the first user based at least in part on a public profile of the second user and the first user profile and transmitting information related to the public profile of the second user to the first user device.

* * * * *